US012680876B2

(12) United States Patent
Miyakawa et al.

(10) Patent No.: US 12,680,876 B2
(45) Date of Patent: Jul. 14, 2026

(54) COLORIMETRIC APPARATUS AND ADJUSTMENT METHOD

(71) Applicant: SEIKO EPSON CORPORATION, Tokyo (JP)

(72) Inventors: Masayoshi Miyakawa, Suwa (JP); Masahide Moriyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 157 days.

(21) Appl. No.: 18/637,660

(22) Filed: Apr. 17, 2024

(65) Prior Publication Data

US 2024/0353263 A1       Oct. 24, 2024

(30) Foreign Application Priority Data

Apr. 20, 2023    (JP) ................................. 2023-069087

(51) Int. Cl.
*G01J 3/52*          (2006.01)
*G01J 3/02*          (2006.01)

(52) U.S. Cl.
CPC ............. *G01J 3/524* (2013.01); *G01J 3/0202* (2013.01); *G01J 3/0267* (2013.01); *G01J 3/0289* (2013.01)

(58) Field of Classification Search
CPC ...... G01J 3/0202; G01J 3/0267; G01J 3/0289; G01J 3/50; G01J 3/52; G01J 3/524
See application file for complete search history.

(56) References Cited

U.S. PATENT DOCUMENTS 7,626,724 B2    12/2009   Kalinka

FOREIGN PATENT DOCUMENTS

JP          2016024006 A  *  2/2016
JP          2018148258 A  *  9/2018
WO      WO-2016181721 A1 *  11/2016   ................ G01J 3/50

* cited by examiner

*Primary Examiner* — Hina F Ayub
(74) *Attorney, Agent, or Firm* — WORKMAN NYDEGGER

(57)          ABSTRACT

In a colorimetric apparatus including a support base configured to support a colorimetric object, a carriage including a detection unit configured to detect a detection target portion formed at the colorimetric object, the carriage supporting a colorimeter, and a movement unit configured to move the carriage, an adjustment value is calculated based on a detection position of the detection unit where the detection unit is caused to detect a detection target portion and a color measurement position of the colorimeter where the colorimeter is caused to measure a color of the detection target portion, and a position of the carriage at the time when a color of a patch is measured is adjusted based on the adjustment value.

15 Claims, 18 Drawing Sheets

COLORIMETRIC APPARATUS AND ADJUSTMENT METHOD

The present application is based on, and claims priority from JP Application Serial Number 2023-069087, filed Apr. 20, 2023, the disclosure of which is hereby incorporated by reference herein in its entirety.

BACKGROUND

1. Technical Field

The present disclosure relates to a colorimetric apparatus and an adjustment method.

2. Related Art

Various colorimetric apparatuses for measuring colors of a colorimetric object have been used. Among the colorimetric apparatuses, there is a colorimetric apparatus to which a colorimeter capable of measuring a color of a patch formed at a colorimetric chart can be attached, the colorimetric apparatus s including a detection unit that detects a detection target portion formed at a colorimetric object. For example, U.S. Pat. No. 7,626,724 discloses an automatic tracking type spectral colorimetric apparatus in which an optical system for measuring a color matrix is guided using information provided by a prefetch sensor.

U.S. Pat. No. 7,626,724 is an example of the related art.

However, in the automatic tracking type spectral colorimetric apparatus of U.S. Pat. No. 7,626,724, when the positional relationship between the optical system and the prefetch sensor deviates from an originally assumed positional relationship, a color measurement position by the optical system is likely to deviate. As explained above, in the colorimetric apparatus of the related art, color measurement accuracy is likely to be deteriorated because a color measurement position of the colorimeter deviates with respect to a detection position of the detection unit. In order to suppress the deviation of the color measurement position of the colorimeter, it is conceivable to increase the patch in size. However, the increase in the size of the patch is likely to cause an increase in a consumption amount of a medium used for the colorimetric chart and an increase in a color measurement time.

SUMMARY

According to an aspect of the present disclosure, there is provided a colorimetric apparatus to which a colorimeter configured to measure a color of a patch formed at a colorimetric chart can be attached, the colorimetric apparatus including: a support base configured to support a colorimetric object, an example of which is the colorimetric chart; a carriage including a detection unit configured to detect a detection target portion formed at the colorimetric object, the carriage supporting the colorimeter; a movement unit configured to move the carriage on the support base; and a control unit configured to control the movement unit, wherein the control unit causes the detection unit to detect the detection target portion and specifies a first position, which is a detection position of the detection unit, causes the colorimeter to measure a color of the detection target portion and specifies a second position, which is a color measurement position of the colorimeter, calculates an adjustment value based on the first position and the second position, and adjusts, based on the adjustment value, a position of the carriage at a time when the color of the patch is measured.

According to another aspect of the present disclosure, there is provided an adjustment method for adjusting a color measurement position of a colorimeter with respect to a detection position of a detection unit in a colorimetric apparatus to which the colorimeter configured to measure a color of a patch formed at a colorimetric chart can be attached, the colorimetric apparatus including: a support base configured to support a colorimetric object, an example of which is the colorimetric chart; a carriage including a detection unit configured to detect a detection target portion formed at the colorimetric object, the carriage supporting the colorimeter; and a movement unit configured to move the carriage on the support base, the adjustment method including: causing the detection unit to detect the detection target portion and specifying a first position, which is a detection position of the detection unit; causing the colorimeter to measure a color of the detection target portion and specifying a second position, which is a color measurement position of the colorimeter; calculating an adjustment value based on the first position and the second position; and adjusting, based on the adjustment value, a position of the carriage at a time when the color of the patch is measured.

BRIEF DESCRIPTION OF THE DRAWINGS

FIG. 5 is a rear view showing the periphery of the carriage of the colorimetric apparatus according to the example of the present disclosure and is a view showing disposition at the time when the colorimeter shown in FIG. 1 is housed and the carriage is scanned.

FIG. 7 is a rear view showing the periphery of the carriage of the colorimetric apparatus according to the example of the present disclosure and is a view showing disposition at the time when the colorimeter shown in FIG. 1 is housed and the carriage is further moved downward from the state shown in FIG. 6 to perform color measurement of the colorimetric object.

FIG. 8 is a rear view showing the periphery of the carriage of the colorimetric apparatus according to the example of the present disclosure and is a view showing disposition in which the colorimeter shown in FIG. 1 is housed and the carriage is further moved downward from the state shown in FIG. 7 and the bottom surface of the carriage is in contact with the colorimetric object.

FIG. 16 is a plan view of an example of a colorimetric object different from the color chart.

FIG. 17 is a graph showing a relation between the position and an output value of the first detection unit at the time of the detection of the detection target portion by the first detection unit.

DESCRIPTION OF EMBODIMENTS

Figure 1:
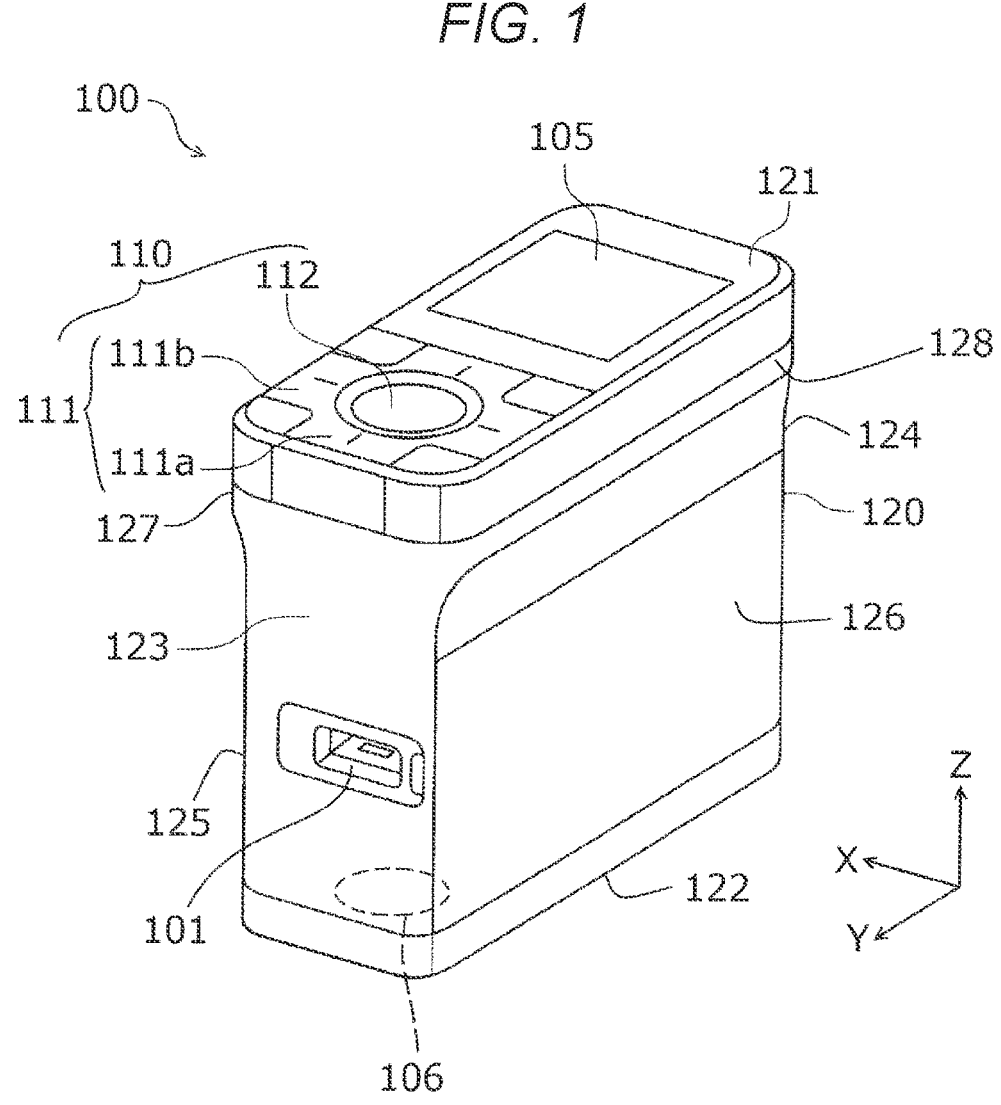
FIG. 1 is a schematic perspective view of a colorimeter usable in a colorimetric apparatus according to an example of the present disclosure.

The present disclosure is schematically explained below.

A colorimetric apparatus according to a first aspect is a colorimetric apparatus to which a colorimeter configured to measure a color of a patch formed at a colorimetric chart can be attached, the colorimetric apparatus including: a support base configured to support a colorimetric object, an example of which is the colorimetric chart; a carriage including a detection unit configured to detect a detection target portion formed at the colorimetric object, the carriage supporting the colorimeter; a movement unit configured to move the carriage on the support base; and a control unit configured to control the movement unit, wherein the control unit causes the detection unit to detect the detection target portion and specifies a first position, which is a detection position of the detection unit, causes the colorimeter to measure a color of the detection target portion and specifies a second position, which is a color measurement position of the colorimeter, calculates an adjustment value based on the first position and the second position, and adjusts, based on the adjustment value, a position of the carriage at a time when the color of the patch is measured.

According to the present aspect, the adjustment value is calculated based on the first position, which is the detection position of the detection unit, and the second position, which is the color measurement position of the colorimeter, and the position of the carriage at the time when the color of the patch is measured is adjusted based on the adjustment value. For this reason, for example, even when a positional relationship between the detection unit and the colorimeter deviates from an originally assumed positional relationship because, for example, the colorimeter is replaced, it is possible to automatically optimize the positional relationship between the detection unit and the colorimeter and it is possible to suppress deterioration in color measurement accuracy due to deviation of the color measurement position of the colorimeter with respect to the detection position of the detection unit. Since the size of the patch can be reduced, a consumption amount of a medium used for the colorimetric chart can be reduced and a color measurement time can be shortened.

A colorimetric apparatus according to a second aspect is an aspect dependent on the first aspect, the colorimetric apparatus including a nonvolatile storage unit configured to store the adjustment value, wherein, after calculating the adjustment value, the control unit may cause the storage unit to store the adjustment value.

According to the present aspect, after calculating the adjustment value, the control unit causes the nonvolatile storage unit to store the adjustment value. For this reason, it is possible to reuse the adjustment value calculated once even after the colorimetric apparatus is turned on again. It is possible to shorten a time for calculating the adjustment value.

A colorimetric apparatus according to a third aspect is an aspect dependent on the first or second aspect, wherein the control unit may specify a position between both ends of the detection target portion as the first position and the second position.

According to the present aspect, the position between both the ends of the detection target portion is specified as the first position and the second position. For this reason, it is possible to accurately grasp the color measurement position of the colorimeter with respect to the detection position of the detection unit.

A colorimetric apparatus according to a fourth aspect is an aspect dependent on any one of the first to third aspects, wherein, when causing the colorimeter to measure the color of the detection target portion, the control unit may repeatedly move and stop the carriage and cause the colorimeter to measure the color of the detection target portion in a state in which the carriage is stopped.

According to the present aspect, when causing the colorimeter to measure the color of the detection target portion, the control unit may repeatedly move and stop the carriage and cause the colorimeter to measure the color of the detection target portion in the state in which the carriage is stopped. For this reason, when the control unit causes the colorimeter to measure the color of the detection target portion, because of, for example, a configuration of the colorimeter, when it is difficult in principle to continuously measure the color of the detection target portion or when a color measurement cycle is long and a color measurement interval tends to be long, by stopping the carriage while shifting the color measurement position little by little and performing color measurement, it is possible to increase resolution in the color measurement for the detection target portion.

A colorimetric apparatus according to a fifth aspect is an aspect dependent on any one of the first to fourth aspects, wherein the carriage may be configured to alternately support a first colorimeter and a second colorimeter as the colorimeter and, when the colorimeter supported by the carriage is changed from the first colorimeter to the second colorimeter, the control unit may cause the second colorimeter to measure the color of the detection target portion and may specify the second position, recalculate the adjustment value, and adjust, based on the recalculated adjustment value, the position of the carriage at the time when the color of the patch is measured.

According to the present aspect, when the colorimeter supported by the carriage is changed from the first colorimeter to the second colorimeter, the control unit causes the second colorimeter to measure the color of the detection target portion and specifies the second position, recalculates the adjustment value, and adjusts, based on the recalculated adjustment value, the position of the carriage at the time when the color of the patch is measured. For this reason, when the colorimeter supported by the carriage is changed, it is possible to recognize the change and automatically calculate an adjustment value before color measurement.

A colorimetric apparatus according to a sixth aspect is an aspect dependent on any one of the first to fifth aspects, further including a support unit configured to support the colorimeter, the support unit having an opening through which a colorimetric unit of the colorimeter is exposed from the carriage in a state in which the colorimeter is supported by the support unit, wherein the detection unit may include a first detection unit and a second detection unit provided across the opening, and the control unit may calculate a first adjustment value serving as the adjustment value corresponding to the first detection unit using a detection position of the first detection unit and calculate a second adjustment value serving as the adjustment value corresponding to the second detection unit using a detection position of the second detection unit and adjust, based on the first adjustment value and the second adjustment value, the position of the carriage at the time when the patch is measured.

According to the present aspect, the detection unit includes the first detection unit and the second detection unit provided across the opening. For this reason, by using the detection unit closer to the detection target portion, it is possible to reduce a moving distance of the carriage at least by the length of the opening and it is possible to reduce the apparatus in size. The control unit calculates the first adjustment value using the detection position of the first detection unit and calculates the second adjustment value using the detection position of the second detection unit and adjusts, based on the first adjustment value and the second adjustment value, the position of the carriage at the time when the color of the patch is measured. Therefore, it is possible to use a method of calculating the first adjustment value for a method of calculating the second adjustment value and it is possible to simplify a control flow.

A colorimetric apparatus according to a seventh aspect is an aspect dependent on any one of the first to fifth aspects, further including a support unit configured to support the colorimeter, the support unit having an opening through which a colorimetric unit of the colorimeter is exposed from the carriage in a state in which the colorimeter is supported by the support unit, wherein the detection unit may include a first detection unit and a second detection unit provided across the opening, and the control unit may calculate a first adjustment value serving as the adjustment value corresponding to the first detection unit using a detection position of the first detection unit and calculate a second adjustment value serving as the adjustment value corresponding to the second detection unit from a positional relationship between the first detection unit and the second detection unit and adjust, based on the first adjustment value and the second adjustment value, the position of the carriage at the time when the color of the patch is measured.

According to the present aspect, the detection unit includes the first detection unit and the second detection unit provided across the opening. For this reason, by using the detection unit closer to the detection target portion, it is possible to reduce a moving distance of the carriage at least by the length of the opening and it is possible to reduce the apparatus in size. The control unit calculates the first adjustment value as the adjustment value corresponding to the first detection unit using the detection position of the first detection unit and calculates the second adjustment value as the adjustment value corresponding to the second detection unit from the positional relationship between the first detection unit and the second detection unit and adjusts, based on the first adjustment value and the second adjustment value, the position of the carriage at the time when the color of the patch is measured. For this reason, when the second adjustment value is calculated, it is possible to omit a detection operation by the second detection unit and shorten a time for calculating the second adjustment value.

A colorimetric apparatus according to an eighth aspect is an aspect dependent on the sixth or seventh aspect, wherein the movement unit may move the carriage in a first direction and a second direction intersecting the first direction, and the first detection unit and the second detection unit may be provided in different positions in both of the first direction and the second direction.

According to the present aspect, the carriage is movable in the first direction and the second direction, and the first detection unit and the second detection unit are provided in the different positions in both of the first direction and the second direction. For this reason, for example, it is possible to reduce moving distances of the carriage in both of the first direction and the second direction with respect to the colorimetric object in which detection target portions are formed in two different parts in the first direction and in two different parts in the second direction. Therefore, it is possible to measure the color of the patch formed at the colorimetric object without positional deviation while particularly effectively suppressing an increase in the size of the colorimetric apparatus.

A colorimetric apparatus according to a ninth aspect is an aspect dependent on any one of the sixth to eighth aspects, wherein the detection target portion may be formed at the colorimetric chart, the colorimetric chart may be square and a linear detection target portion serving as the detection target portion may be formed along four sides of the colorimetric chart, and the control unit may specify the position of the patch based on a result of the first detection unit and the second detection unit detecting the linear detection target portion.

According to the present aspect, the control unit specifies the position of the patch based on the result of the first detection unit and the second detection unit detecting the linear detection target portion with respect to the colorimetric object, which is square and in which the linear detection target portion serving as the detection target portion is formed along the four sides. With such a configuration, since the four sides can be measured, for example, by calculating intersections of the four sides, it is possible to accurately grasp an inclination or the like of the colorimetric object with respect to the support base and it is possible to particularly accurately specify the position of the patch.

A colorimetric apparatus according to a tenth aspect is an aspect dependent on the ninth aspect, wherein the control unit may calculate positions of four straight lines extending along the linear detection target portion and positions of intersections of the straight lines based on a result of the first detection unit and the second detection unit detecting, at least at two points, the linear detection target portion corresponding to each one side of the colorimetric chart and specify the position of the patch based on the calculated positions of the intersections.

For example, a colorimetric object made of a soft material is easily deformed, and a rectangular colorimetric object is sometimes supported by the support base in a trapezoidal shape. In such a case, if the position of the patch is specified on the assumption that the colorimetric object is rectangular, the position of the patch is likely to deviate from an actual position. However, according to the present aspect, the control unit calculates the positions of the four straight lines extending along the linear detection target portions and the positions of the intersections of the straight lines based on the result of the first detection unit and the second detection unit detecting, at least at the two points, the linear detection target portions corresponding to each one side of the colorimetric object and specifies the position of the patch based on the calculated positions of the intersections. For this reason, even when the rectangular colorimetric object is supported by the support base in a trapezoidal shape, it is possible to grasp, based on the detection results of the first detection unit and the second detection unit, that the colorimetric object is supported by the support base in the trapezoidal shape and it is possible to accurately specify the position of the patch based on the calculated positions of the intersections.

A colorimetric: apparatus according to an eleventh aspect is an aspect dependent on any one of the sixth to eighth aspects, wherein the detection target portion may be formed at the colorimetric chart, the colorimetric chart may be square, corner detection target portions serving as the detection target portion may be formed at least at three corners among four corners of the colorimetric chart, and the control unit may specify, based on a result of the first detection unit and the second detection unit detecting the corner detection target portions, a direction of the colorimetric object supported by the support base.

For example, because of a user's mistake or the like, a rectangular colorimetric object is sometimes supported by the support base in a direction rotated by 180° when viewed from a support direction of the support base. However, according to the present aspect, for the colorimetric object, which is square and in which the corner detection target portions serving as the detection target portion are formed at least at the three corners among the four corners of the colorimetric object, the direction of the colorimetric object supported by the support base is specified based on the result of the first detection unit and the second detection unit detecting the corner detection target portion. For this reason, even when a rectangular colorimetric object is supported by the support base in a direction rotated by 180° when viewed from the support direction of the support base, it is possible to recognize the fact and accurately specify the position of the patch.

A colorimetric apparatus according to a twelfth aspect is an aspect dependent on any one of the first to eighth aspects, wherein the detection target portion may be formed at the colorimetric chart and may also play a role of detecting a position of the colorimetric chart supported by the support base.

According to the present aspect, the detection target portion is formed at the colorimetric chart and also plays the role of detecting the position of the colorimetric chart supported by the support base. As explained above, since the detection target portion is provided in the colorimetric chart, it is possible to save time and effort to prepare, separately from the colorimetric chart, the colorimetric object at which the detection target portion is formed.

A colorimetric apparatus according to thirteenth aspect is an aspect dependent on any one of the first to eighth aspects, the detection target portion may be formed at the colorimetric object separate from the colorimetric chart.

According to the present aspect, the detection target portion is formed at the colorimetric object separate from the colorimetric chart. For this reason, for example, when an adjustment value is calculated only in an inspection process before shipment, it is possible to eliminate the need to form the detection target portion in the colorimetric chart and it is possible to expand a formation region of patches of the measurement chart.

A colorimetric apparatus according to a fourteenth aspect is an aspect dependent on any one of the first to thirteenth aspects, wherein the colorimeter may be provided to be attachable to and detachable from the colorimetric apparatus.

According to the present aspect, the colorimeter is provided attachable to and detachable from the colorimetric apparatus. For this reason, the colorimeter can be used without being attached to the colorimetric apparatus. It is possible to improve the usability of the colorimeter.

According to a fifteenth aspect of the present disclosure, there is provided an adjustment method for adjusting a color measurement position of a colorimeter with respect to a detection position of a detection unit in a colorimetric apparatus to which the colorimeter configured to measure a color of a patch formed at a colorimetric chart can be attached, the colorimetric apparatus including: a support base configured to support a colorimetric object, an example of which is the colorimetric chart; a carriage including a detection unit configured to detect a detection target portion formed at the colorimetric object, the carriage supporting the colorimeter; and a movement unit configured to move the carriage on the support base, the adjustment method including: causing the detection unit to detect the detection target portion and specifying a first position, which is a detection position of the detection unit; causing the colorimeter to measure a color of the detection target portion and specifying a second position, which is a color measurement position of the colorimeter; and calculating an adjustment value based on the first position and the second position and adjusting, based on the adjustment value, a position of the carriage at a time when the color of the patch is measured.

According to the present aspect, the adjustment value is calculated based on the first position, which is the detection position of the detection unit, and the second position, which is the color measurement position of the colorimeter, and the position of the carriage at the time when the color of the patch is measured is adjusted based on the adjustment value. For this reason, for example, even when a positional relationship between the detection unit and the colorimeter deviates from an originally assumed positional relationship because, for example, the colorimeter is replaced, it is possible to automatically optimize the positional relationship between the detection unit and the colorimeter and it is possible to suppress deterioration in color measurement accuracy due to deviation of the color measurement position of the colorimeter with respect to the detection position of the detection unit. Since the size of the patch can be reduced, a consumption amount of a medium used for the colorimetric chart can be reduced and a color measurement time can be shortened.

The present disclosure is specifically explained below.

Note that an X-Y-Z coordinate system shown in the figures is an orthogonal coordinate system. An X-Y plane is a horizontal plane and an X-Z plane and a Y-Z plane are vertical planes. Here, a Z-axis direction is the vertical direction, that is, the height direction, a +Z direction is a vertically upward direction, and a −Z direction is a vertically downward direction. An X-axis direction is the horizontal direction orthogonal to the Z-axis direction, which is the vertical direction. A Y-axis direction is the horizontal direction and is a direction orthogonal to both of the X-axis direction and the Z-axis direction. Note that, in the following explanation, a +Y direction side of a colorimetric apparatus 1 is set as a rear direction side, a −Y direction side of the colorimetric apparatus 1 is set as a front direction side, a +X direction side of the colorimetric apparatus 1 is set as a right direction side, and a −X direction side of the colorimetric apparatus 1 is set as a left direction side.

First, with reference to FIG. 1, an example of a colorimeter 100 usable in the colorimetric apparatus 1 according to an embodiment of the present disclosure is explained. The colorimeter 100 in the present example is an optical device that includes a colorimetric port 106, emits light in the −Z direction from the colorimetric port 106, and receives light reflected by a color chart 10A, which is a colorimetric object 10 represented by FIG. 2, to perform color measurement. In other words, an optical axis direction is the Z-axis direction and the position of the optical axis corresponds to the position of the colorimetric port 106.

The colorimeter 100 in the present example includes a housing 120 having an upper surface 121, which is a surface on a +Z direction side, a colorimetric surface 122, which is a colorimetric unit and is a bottom surface on a −Z direction side and is provided with the colorimetric port 106, a rear surface 123, which is a surface on the +Y direction side, a front surface 124, which is a surface on the −Y direction side, a right side surface 125, which is a surface on the +X direction side, and a left side surface 126, which is a surface on the −X direction side.

On the upper surface 121, an operation unit 110 and a screen unit 105 are disposed in the Y-axis direction. Specifically, the operation unit 110 is provided on the +Y direction side of the upper surface 121 and the screen unit 105 is provided on the −Y direction side of the upper surface 121. The operation unit 110 includes a plus-shaped button 111 formed by a bar shape 111a extended in the Y-axis direction and a bar shape 111b extended in the X-axis direction and a determination button 112 provided in the center of the plus-shaped button 111. For example, for a plurality of menus displayed on the screen unit 105, the user can move a menu that becomes active forward, backward, leftward, and rightward by pressing the plus-shaped button 111 and can determine a desired menu by pressing the determination button 112.

Figure 2:
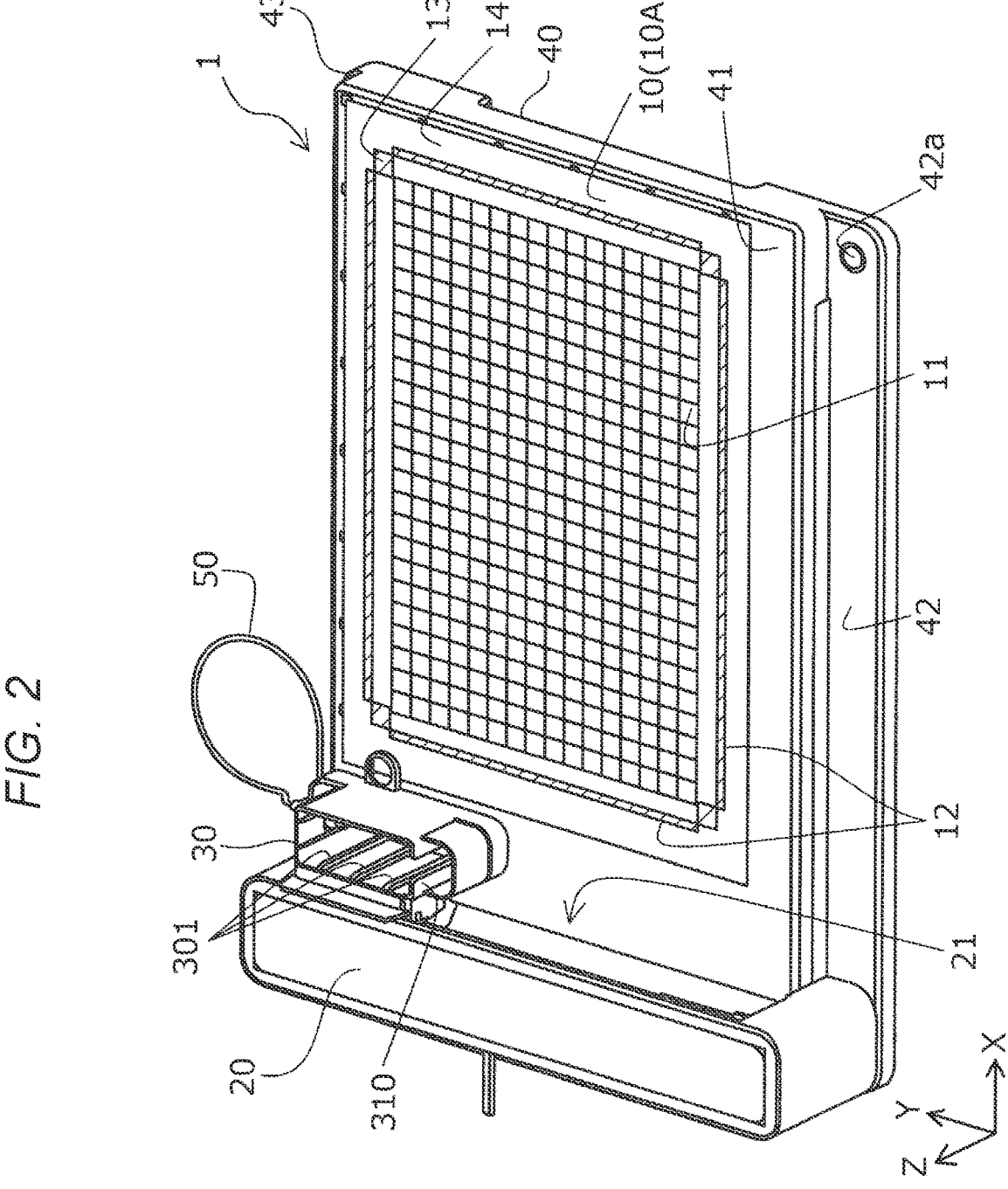
FIG. 2 is a perspective view of the colorimetric apparatus according to the example of the present disclosure.

A terminal 101 to which a USB cable 50 represented by FIG. 2 and the like can be connected is formed at the rear surface 123. The colorimeter 100 in the present example is provided with a convex portion 127 and a convex portion 128 which are convex toward the outer side when viewed in the Y-axis direction. Specifically, the convex portion 127 is provided in a region further on the +Z direction side than the center in the Z-axis direction on the right side surface 125 and the convex portion 128 is provided in a region further on the +Z direction side than the center in the Z-axis direction on the left side surface 126.

Next, a detailed configuration of the colorimetric apparatus 1 according to the example of the present disclosure is explained with reference to FIGS. 2 to 4. FIG. 2 shows a configuration of the colorimetric apparatus 1 according to the present example. The colorimetric apparatus 1 includes a main body unit 40 including a support base 41 extended in the X-axis direction and the Y-axis direction and a gantry 20 extended in the Y-axis direction to cover a part of the support base 41 from the +Z direction side.

A carriage 30 including a support unit 310 capable of housing the colorimeter 100 is attached to the gantry 20. The gantry 20 is movable in the X-axis direction with respect to the support base 41. The carriage 30 is movable in the Y-axis direction with respect to the gantry 20. These movements are also called scanning. Here, the carriage 30 is capable of moving in the Y-axis direction with respect to the gantry 20 and is also capable of moving in the Z-axis direction with respect to the gantry 20. One end of the USB cable 50 is coupled to the gantry 20. The other end of the USB cable 50 is coupled to the colorimeter 100 housed in the carriage 30.

The color chart 10A, which is a colorimetric chart as an example of the colorimetric object 10, can be placed on the support base 41. The color chart 10A is configured with, for example, a plurality of color patches 11, black frames 12, and corner detection target portions 13 being formed at a fabric portion 14. The color chart 10A is fixed to the support base 41 by, for example, attaching an adhesive tape around the color chart 10A and corresponds to, for example, automatic color measurement for up to the A3 size. However, since the gantry 20 is formed in a gate shape when viewed from the X-axis direction and includes a space portion 21 corresponding to the gate shape, long paper exceeding the A3 size in the X-axis direction can also be placed on the support base 41.

Note that a front surface 42 is provided in a position further downward to the −Z direction side than the support base 41 on the −Y direction side of the main body unit 40. A rear surface 43 is provided in a position further downward to the −Z direction side than the support base 41 on the +Y direction side of the main body unit 40. A power button 42a, which is an example of an operation unit of the colorimetric apparatus 1, is provided on the front surface 42.

Figure 3:
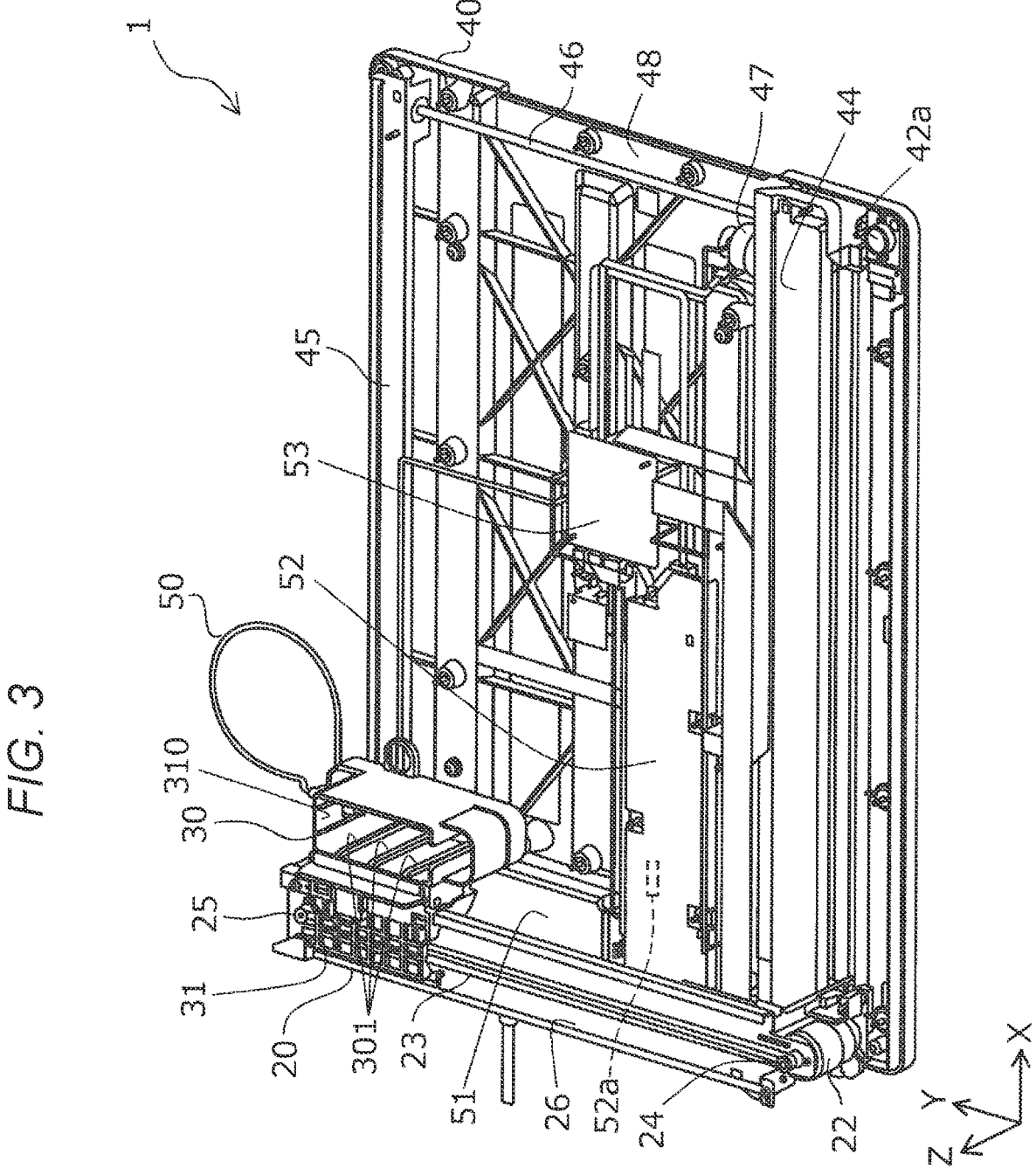
FIG. 3 is a perspective view showing an internal configuration of the colorimetric apparatus according to the example of the present disclosure.

FIG. 3 shows an internal configuration of the colorimetric apparatus 1 and is a view in which exterior components shown in FIG. 2 are removed. A front frame 44 and a rear frame 45 are disposed on the +Z direction side, which is the upper side of a case lower 48, to be extended in the X-axis direction at an interval. A gantry frame 26 formed in a gate shape forming a part of the gantry 20 moves in the X-axis direction along the front frame 44 and the rear frame 45.

The front frame 44 and the rear frame 45 are coupled by a coupling shaft 46 in a position on the +X direction side of the main body unit 40. Rotational drive of a gantry motor 47, which is a power source for moving the gantry 20 in the X-axis direction, is transmitted from the gantry motor 47 to the coupling shaft 46 via a not-shown gear group. Then, by the rotational drive transmitted to the coupling shaft 46, a not-shown endless belt suspended by a not-shown pulley provided on a front frame 44 side, which is the −Y direction side of the coupling shaft 46, and a not-shown endless belt suspended by a not-shown pulley provided on a rear frame 45 side, which is the +Y direction side of the coupling shaft 46, are rotated to move the gantry frame 26 coupled to these endless belts.

A carriage motor 22 is fixed to the front side corresponding to the −Y direction side of the gantry frame 26. An endless carriage belt 23 laid over a front pulley 24 and an inner pulley 25 rotates via the front pulley 24 coupled to the carriage motor 22. A carriage slider 31 configuring a part of the carriage 30 is fixed to the carriage belt 23 and moves in the Y-axis direction according to the rotating motion of the carriage belt 23 involved in the rotating motion of the carriage motor 22. Note that a main board 52 and a sub-board 53 as a control unit, a power supply box 51, and the like are provided in the main body unit 40. Note that the main board 52 as the control unit is provided with a nonvolatile storage unit 52a capable of storing information.

Figure 4:
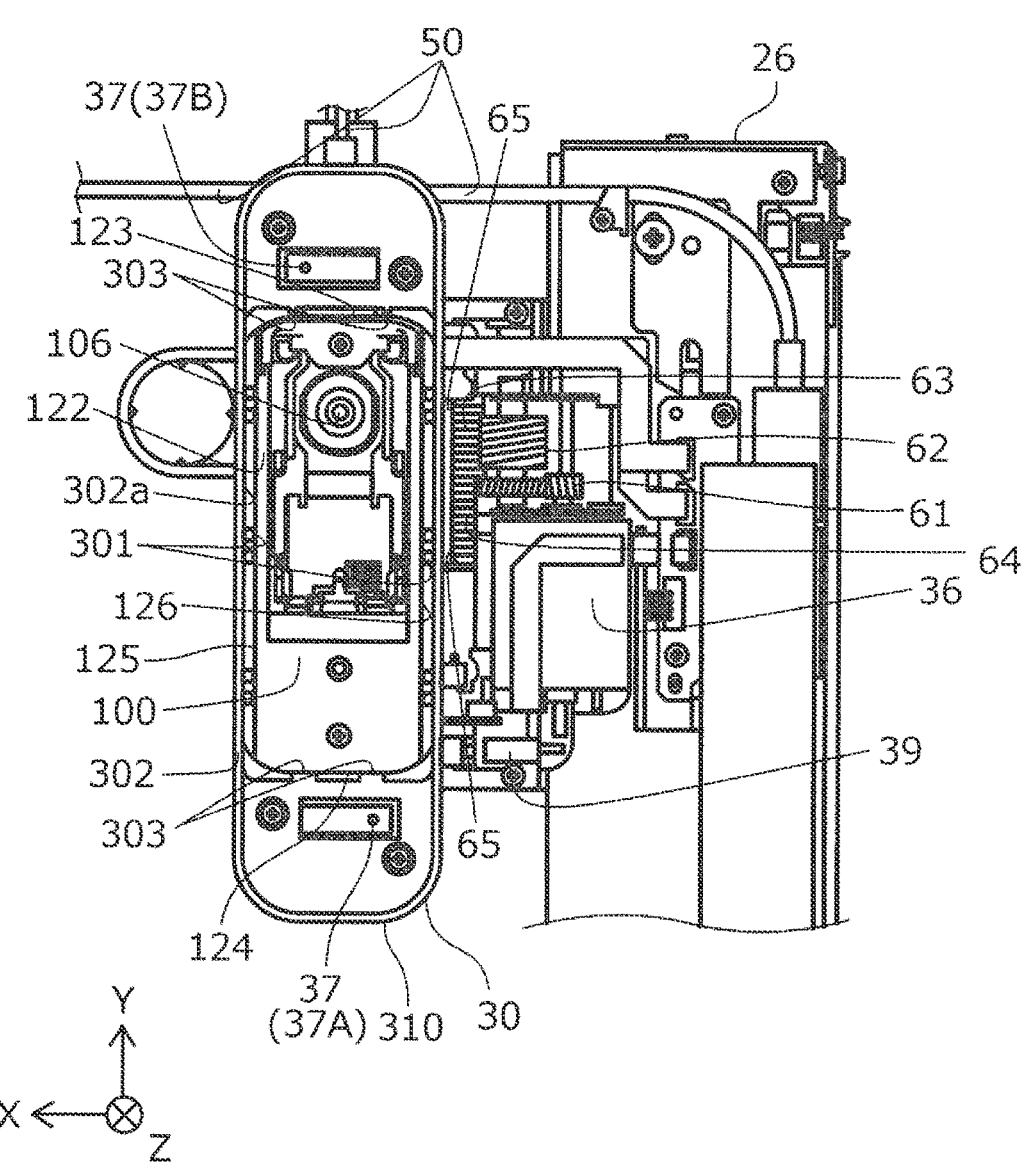
FIG. 4 is a bottom view showing the periphery of a carriage of the colorimetric apparatus according to the example of the present disclosure and is a view showing a state in which the colorimeter shown in FIG. 1 is housed.

FIG. 4 is a bottom view showing the periphery of the carriage 30 in a state in which the colorimeter 100 is attached to the carriage 30. In the colorimeter 100, with respect to the carriage 30, the right side surface 125 and the left side surface 126 are supported in the Y-axis direction by ribs 301 provided on the carriage 30 and the rear surface 123 and the front surface 124 are supported in the X-axis direction by ribs 303 provided on the carriage 30. Note that, as represented by FIG. 4, a front side sensor 37A and a rear side sensor 37B as a detection unit 37 capable of detecting the width of the color chart 10A and the positions of the color patches 11 by reading the positions of the black frames 12 of the color chart 10A are provided on the surface on the −Z direction side of the carriage 30. Here, as represented by FIG. 4, the carriage 30 includes the support unit 310 that supports the colorimeter 100. The support unit 310 has a hole 302a, which is an opening for exposing the colorimetric surface 122 of the colorimeter 100 from the carriage 30 in a state in which the colorimeter 100 is supported. The front side sensor 37A as a first detection unit and the rear side sensor 37B as a second detection unit that detect the black frames 12, the corner detection target portions 13, and the like serving as the detection target portions are provided in the carriage 30 across the hole 302a.

The carriage 30 slides in the Z-axis direction with respect to the gantry 20 via a rack gear 65 when the power of a Z-axis moving direction movement motor 36, which is a drive source, is transmitted, in order, to a motor gear 61, a worm gear 62, a first drive gear 63, and a second drive gear 64. As represented by FIG. 4, the carriage 30 is provided with a home position sensor 39 that detects whether the position in the Z-axis direction of the carriage 30 with respect to the gantry 20 is in a home position.

Figure 5:
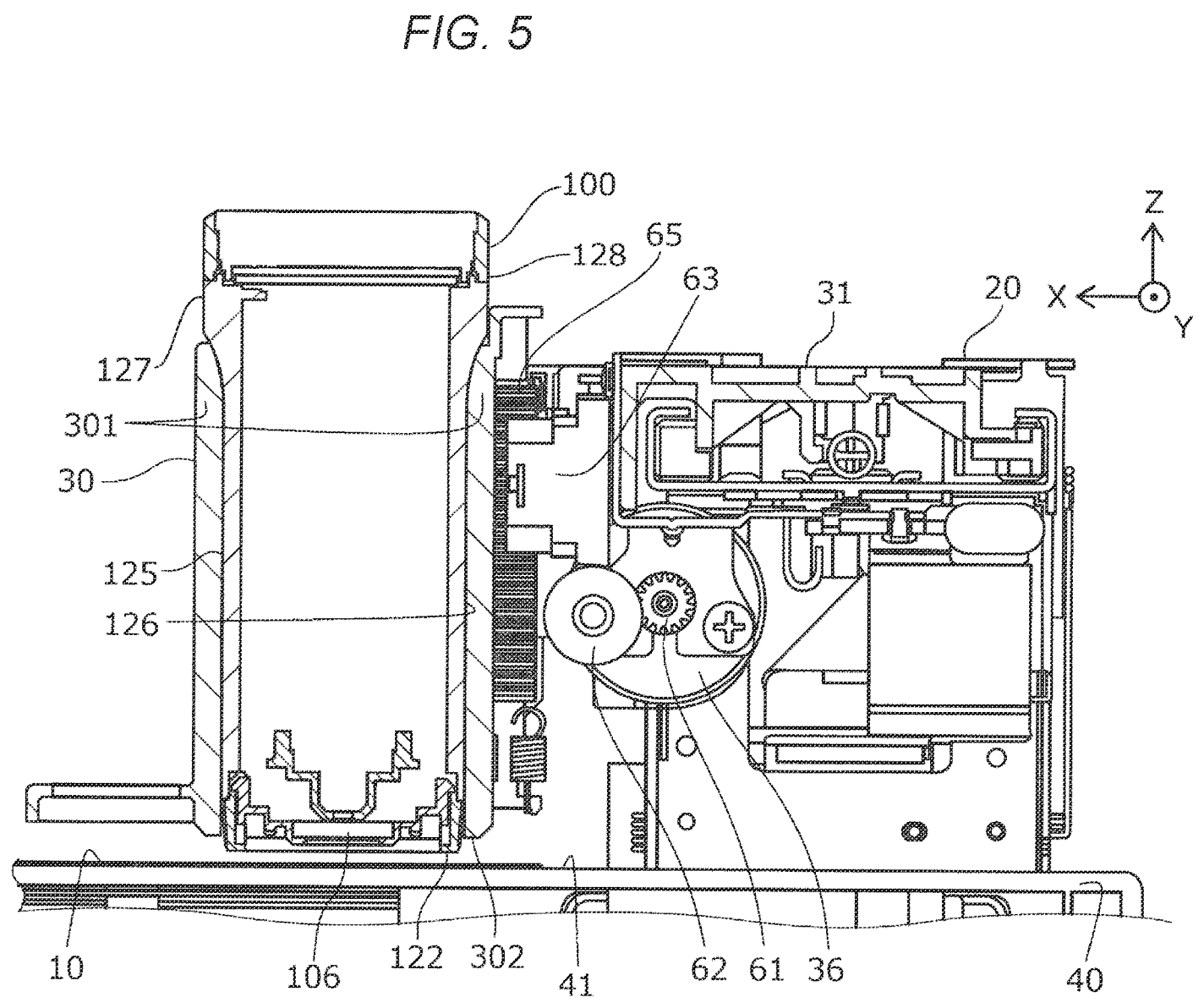

Next, the position in the Z-axis direction of the carriage 30 with respect to the gantry 20, that is, the positions in the Z-axis direction of the carriage 30 and the colorimeter 100 housed in the carriage 30 with respect to the colorimetric object 10 placed on the support base 41 are explained with reference to FIGS. 5 to 9. FIG. 5 is a diagram showing disposition at the time when the carriage 30 is scanned in a state in which the colorimeter 100 is housed in the carriage 30, that is, when the carriage 30 is moved in the Y-axis direction with respect to the gantry 20. At this time, both the colorimetric surface 122 of the colorimeter 100 and a bottom surface 302 of the carriage 30 are in a state in which there is a gap in the Z-axis direction with respect to the colorimetric object 10.

Figure 6:
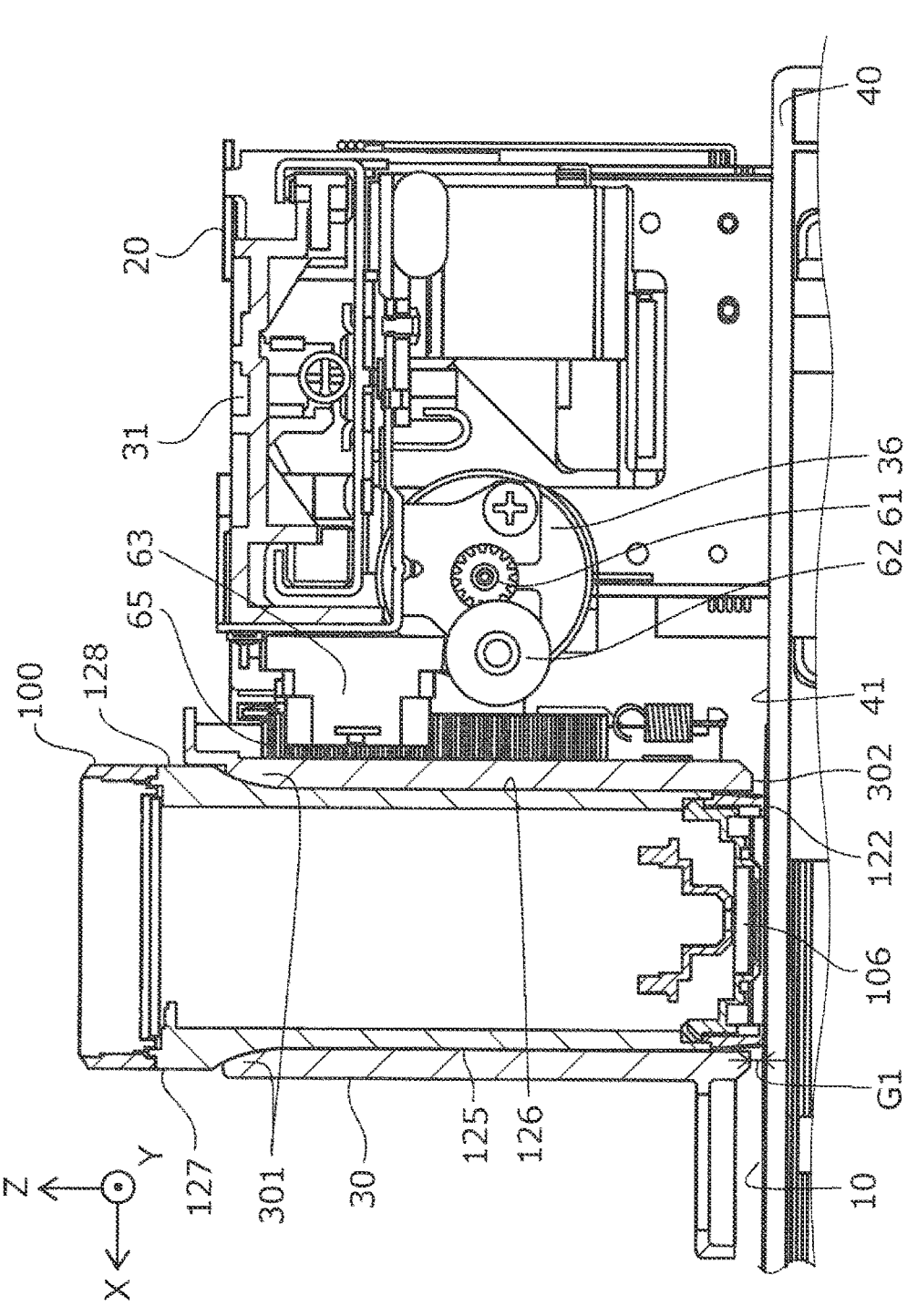
FIG. 6 is a rear view showing the periphery of the carriage of the colorimetric apparatus according to the example of the present disclosure and is a view showing disposition at an instance when the colorimeter shown in FIG. 1 is housed and the carriage is moved downward from the state shown in FIG. 5 and a colorimetric unit comes into contact with a colorimetric object.

FIG. 6 is a diagram showing disposition at an instance when the carriage is moved in the −Z direction, which is the downward direction, from the state shown in FIG. 5 and the colorimetric surface 122 of the colorimeter 100 comes into contact with the colorimetric object 10. Note that, for example, in the present embodiment, a gap G1 in the Z-axis direction between the bottom surface 302 of the carriage 30 and the colorimetric object 10 at this time is 2 mm. Here, in the present example, the colorimeter 100 is housed in the carriage 30 in a state in which, with own weight of the colorimeter 100, the convex portion 127 and the convex portion 128 are caught by and placed on the ribs 301 provided in the carriage 30, and the colorimetric surface 122 of the colorimeter 100 projects in the −Z direction from the hole 302a, which is the opening provided on the bottom surface 302 of the carriage 30 represented by FIG. 4.

Figure 7:
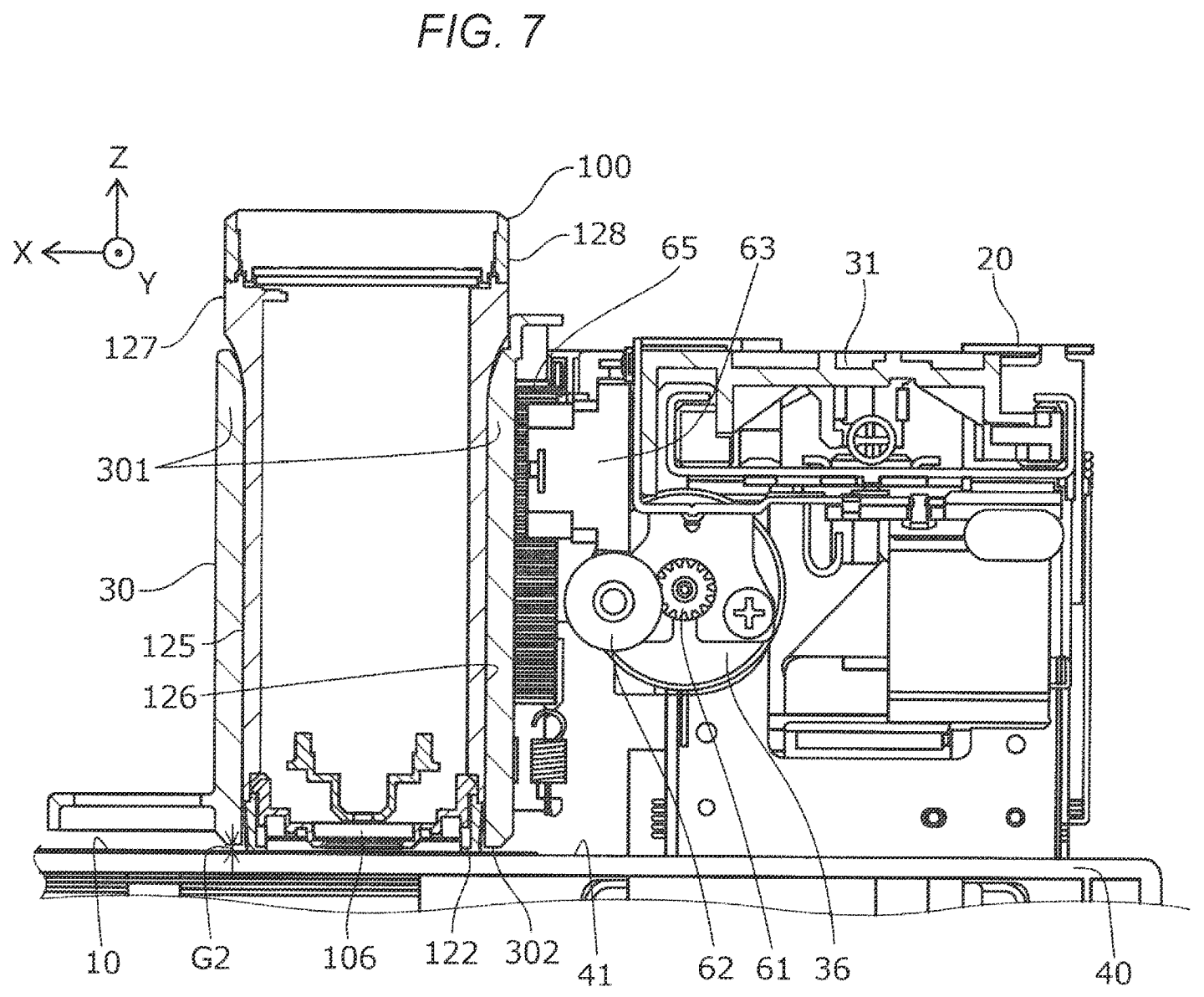

For this reason, as represented by FIG. 7, when the carriage 30 is further moved in the −Z direction from the state shown in FIG. 6, the own weight of the colorimeter 100 is applied to the colorimetric surface 122. Note that FIG. 7 shows disposition of the colorimetric object 10 at the time of color measurement, that is, disposition of the color patches 11, the black frames 12, and the like of the color chart 10A at the time when color measurement is performed. Note that, for example, in the present embodiment, a gap G2 in the Z-axis direction between the bottom surface 302 of the carriage 30 and the colorimetric object 10 at this time is 1 mm. In other words, in the colorimetric apparatus 1 in the present example, when the color of the colorimetric object 10 is measured, the colorimetric surface 122 comes into contact with the colorimetric object 10 but a gap is provided on the bottom surface 302 of the carriage 30.

In the colorimetric apparatus 1 in the present example, the color measurement is performed in a state in which the entire circumference of the colorimetric surface 122 of the colorimeter 100 viewed from the Z-axis direction comes into contact with the colorimetric object 10 on the support base 41 and conforms to the surface of the colorimetric object 10. With such a configuration, since the color measurement can be performed in a state in which the colorimetric port 106, which is the optical axis opening of the colorimeter 100, is covered with the colorimetric surface 122, the color measurement is less easily affected by external light and color measurement accuracy is improved. Note that it is possible to perform the color measurement in a state in which the color measurement is less easily affected by external light even in the state shown in FIG. 6. However, a deviation sometimes occurs in a holding position of the colorimeter 100 by the carriage 30 or the distance from the colorimetric surface 122 to the support base 41 because tolerance involved in manufacturing variations of components or the like occurs in the carriage 30, the colorimeter 100, and the support base 41. However, by further lowering the carriage 30 from the state shown in FIG. 6, the color measurement can be performed without being affected by such a tolerance.

In the state shown in FIG. 7, the gap G2 is formed between the bottom surface 302 of the carriage 30 and the colorimetric object 10 and the bottom surface 302 of the carriage 30 and the colorimetric object 10 are separated. For this reason, the weight of the carriage 30 is not transmitted to the colorimetric object 10 and only the own weight of the colorimeter 100 is applied to the colorimetric object 10. Therefore, since the colorimeter 100 comes into contact with the colorimetric object 10 in a state in which a moderate load is applied to the colorimeter 100, the colorimetric object 10 is less easily damaged.

Figure 8:
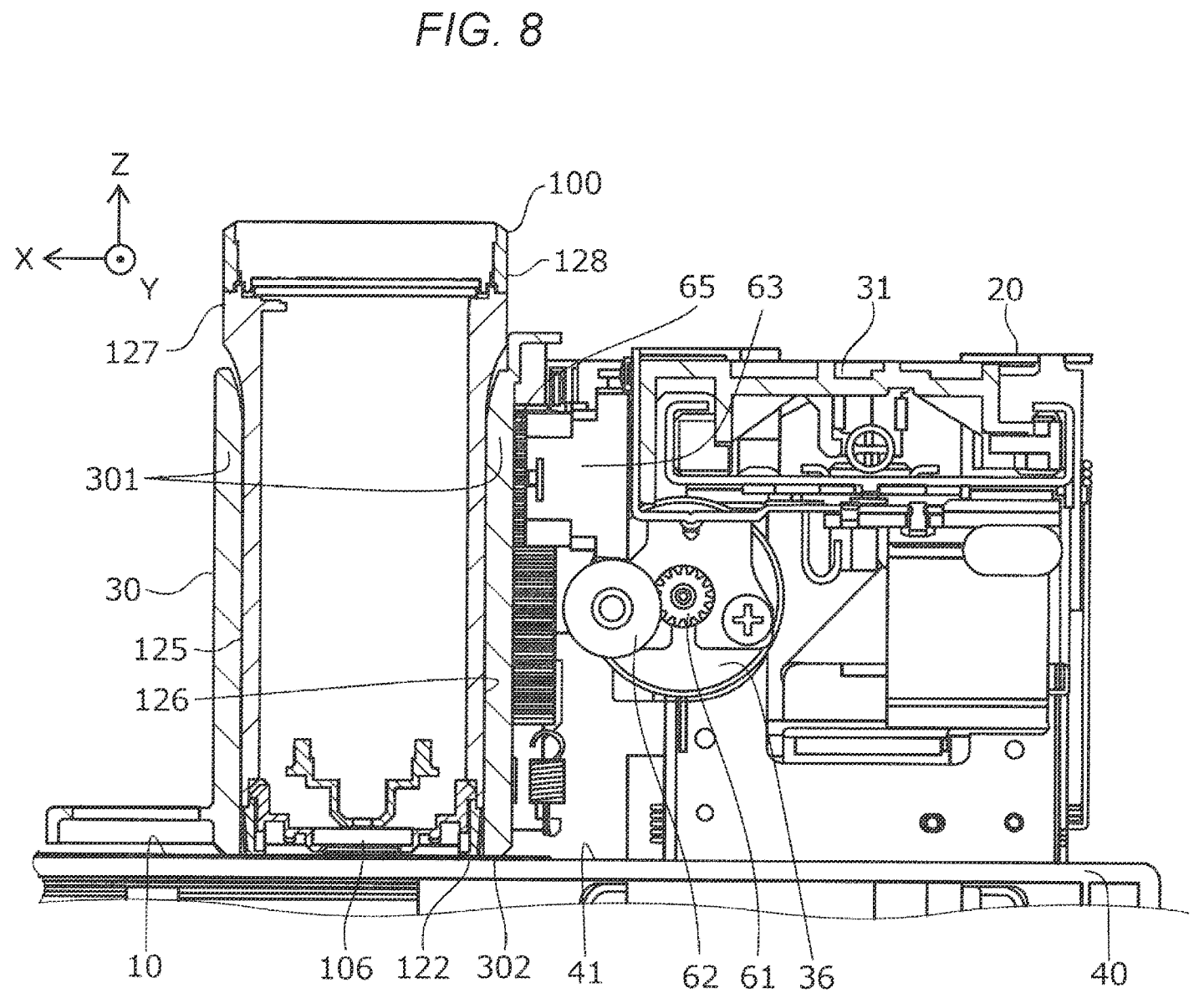

Note that the colorimetric apparatus 1 in the present example is capable of performing color measurement for not only the color chart 10A but also the various colorimetric objects 10. As the colorimetric object 10 for which the colorimetric apparatus 1 in the present example is capable of performing color measurement, there are colorimetric objects having various thicknesses. For this reason, the colorimetric apparatus 1 in the present example can bring the carriage 30 into contact with the colorimetric object 10 by moving the carriage 30 in the Z-axis direction with respect to the colorimetric object 10 to be used and measure contact height, which is the height of the carriage 30 at the time of the contact. From another viewpoint, the contact height of the carriage 30 is the height of the carriage 30 at the time when the carriage 30 comes into contact with the colorimetric object 10. Specifically, in order to learn the contact height of the carriage 30, the colorimetric apparatus 1 in the present example can learn the contact height of the carriage 30 by driving the Z-axis moving direction movement motor 36 to continue to reduce the height of the carriage 30 until the bottom surface 302 of the carriage 30 hits the colorimetric object 10 and the load of the Z-axis moving direction movement motor 36 exceeds a certain threshold and detecting the height at which the load exceeds the threshold. In order to learn the contact height of the carriage 30, FIG. 8 shows a state at the time when the bottom surface 302 of the carriage 30 hits the colorimetric object 10 and the load of the Z-axis moving direction movement motor 36 exceeds the certain threshold.

Figure 9:
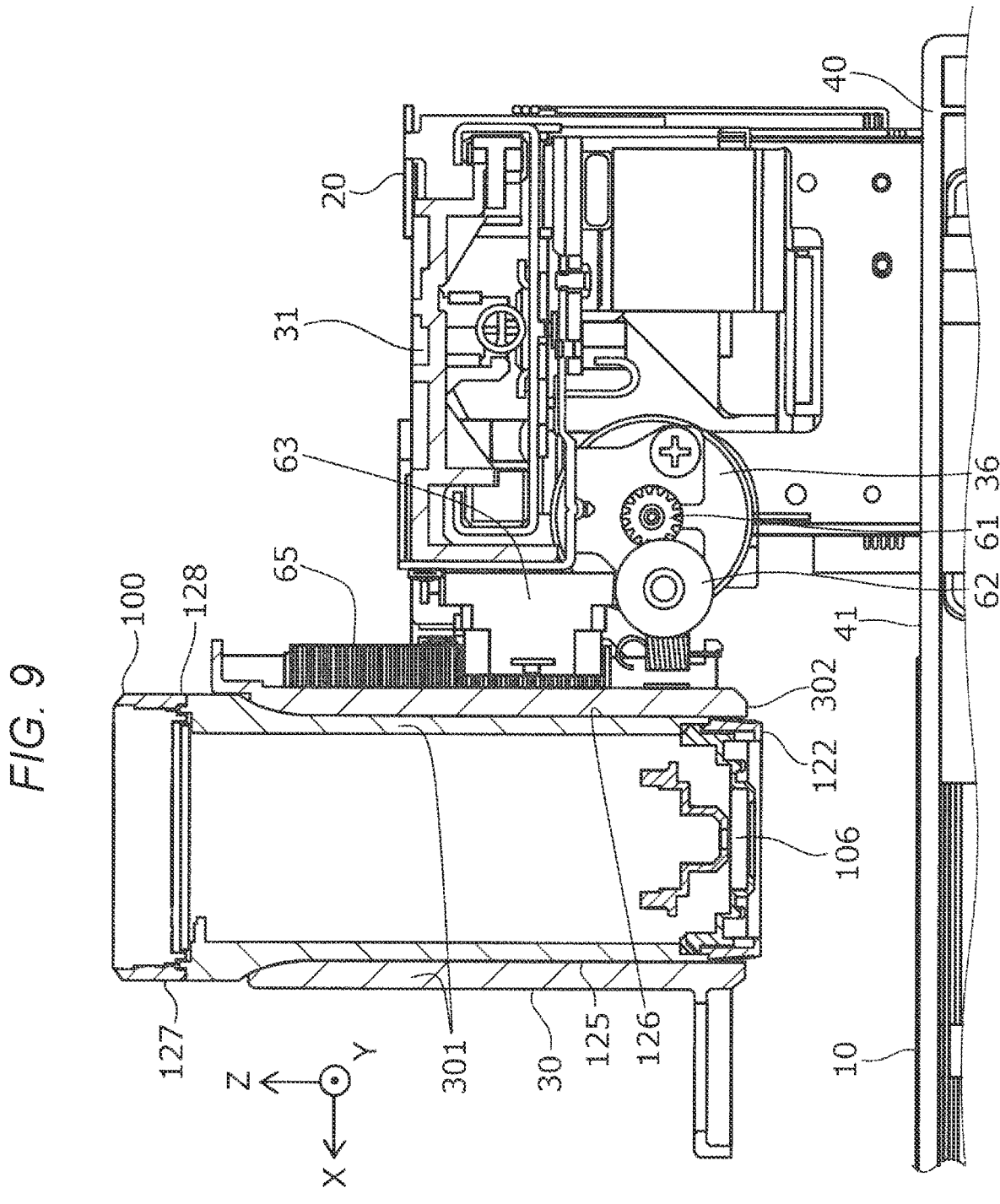
FIG. 9 is a rear view showing the periphery of the carriage of the colorimetric apparatus according to the example of the present disclosure and is a view showing disposition in a state in which the colorimeter shown in FIG. 1 is housed and the carriage is moved to a home position.

As explained above, the colorimetric apparatus 1 in the present example is provided with the home position sensor 39 that detects whether the position in the Z-axis direction of the carriage 30 with respect to the gantry 20 is in the home position. FIG. 9 shows a state in which the carriage 30 is in the home position in the Z-axis direction.

As explained above, the colorimetric apparatus 1 in the present example is the colorimetric apparatus to which the colorimeter 100 for measuring the color patches 11 of the color chart 10A on which the color patches 11 are formed can be attached. The colorimetric apparatus 1 in the present example includes the support base 41 that supports the colorimetric object 10 such as the color chart 10A. The colorimetric apparatus 1 in the present example includes the carriage 30 including the front side sensor 37A and the rear side sensor 37B serving as the detection unit 37, which detects detection target portions such as the color patches 11 and the black frames 12 formed at the colorimetric object 10, and supports the colorimeter 100. The colorimetric apparatus 1 in the present example includes the gantry 20. The gantry 20 includes the carriage motor 22, the carriage belt 23, the front pulley 24, the inner pulley 25 and the like, and plays the role of the movement unit that moves the carriage 30 on the support base 41. The colorimetric apparatus 1 in the present example includes the main board 52 serving as the control unit that controls the colorimeter 100, the carriage 30, and the gantry 20.

Here, as explained above, in the colorimetric apparatus 1 in the present example, the colorimeter 100 is housed in the carriage 30 in the state in which, with the own weight of the colorimeter 100, the convex portion 127 and the convex portion 128 are caught by and placed on the ribs 301 provided in the carriage 30. In the colorimetric apparatus 1 in the present example, the colorimeter 100 is attachable and detachable. In the colorimetric apparatus 1 having such a configuration, the position of the colorimetric port 106 of the colorimeter 100, that is, the color measurement position of the colorimeter 100 is likely to deviate with respect to the position of the carriage 30. The carriage 30 is provided with the front side sensor 37A and the rear side sensor 37B serving as the detection unit 37. For this reason, in other words, in the colorimetric apparatus 1 having such a configuration, the second position, which is the color measurement position of the colorimeter 100, tends to deviate with respect to the first position, which is the detection position of the detection unit 37. Therefore, in the colorimetric apparatus 1 in the present example, the position of the carriage 30 can be adjusted such that the color measurement position at the time when the color of the color patches 11 is measured by the colorimeter 100 does not deviate even when the second position (the color measurement position of the colorimeter 100) deviates with respect to the first position (the detection position of the detection unit 37). Note that the detection position of the detection unit 37 can be regarded as a position on the X-Y plane of the carriage 30 at the time when the detection unit 37 detects the detection target portion. Similarly, the color measurement position of the colorimeter 100 can be regarded as a position on the XY plane of the carriage 30 at the time when the colorimeter 100 measures the color of the detection target portion.

An example of an adjustment method for adjusting the color measurement position of the colorimeter 100 with respect to the detection position of the detection unit 37, which is performed using the colorimetric apparatus 1 in the present example, is explained below with reference to FIGS. 10 to 17. Specifically, an adjustment method for adjusting the color measurement position of the colorimeter 100 with respect to the detection position of the detection unit 37 when the color chart 10A is used as the colorimetric object 10 is explained.

Figure 10:
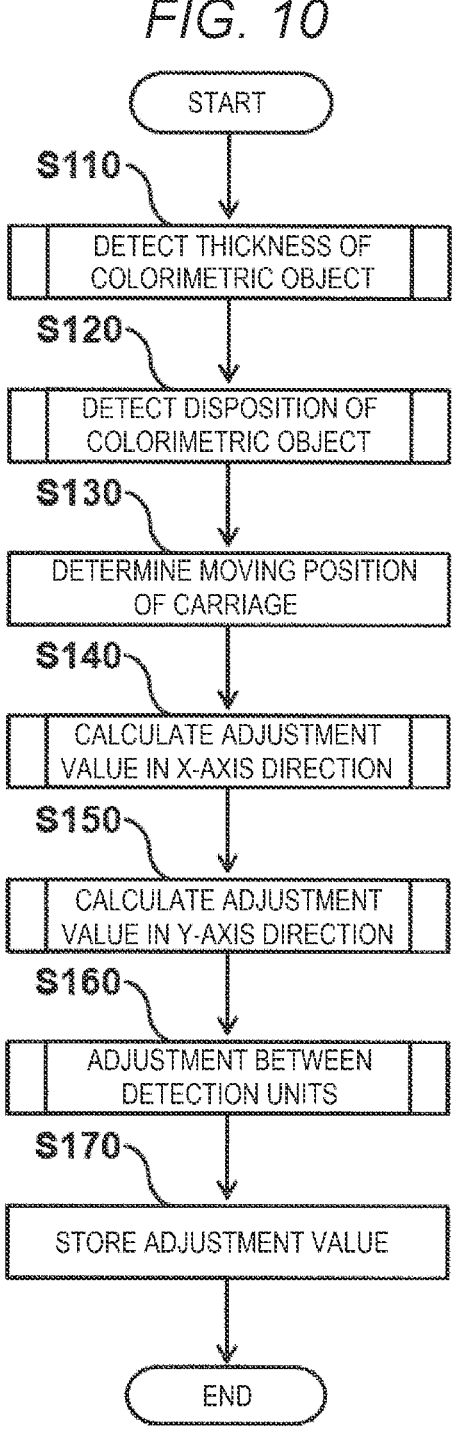
FIG. 10 is a flowchart of an example of an adjustment method for adjusting a color measurement position of a colorimeter with respect to a detection position of a detection unit, the adjustment method being performed using the colorimetric apparatus according to the example of the present disclosure.
Figure 11:
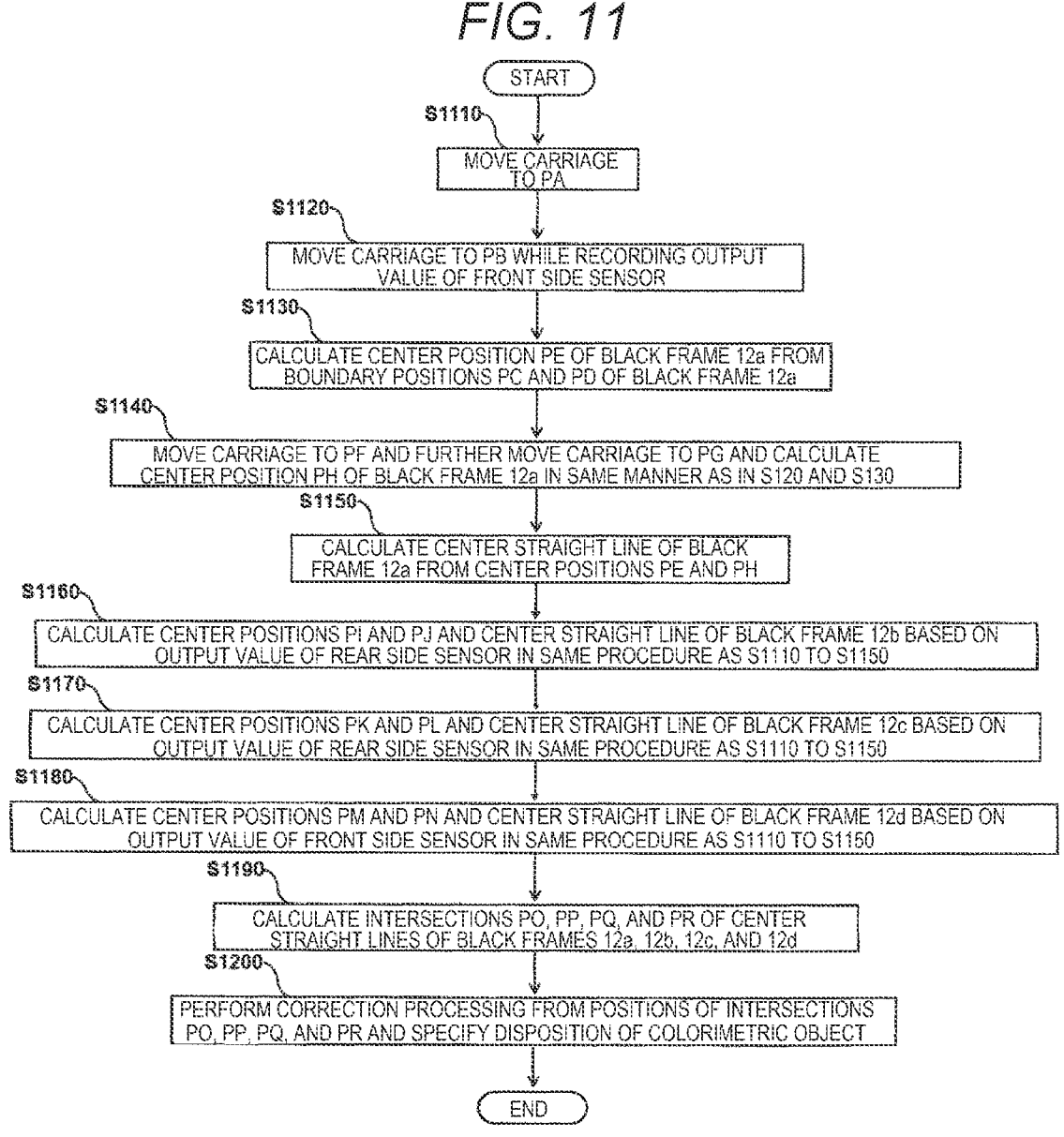
FIG. 11 is a flowchart showing a flow of a colorimetric object disposition detection process in the flowchart of FIG. 10.
Figure 12:
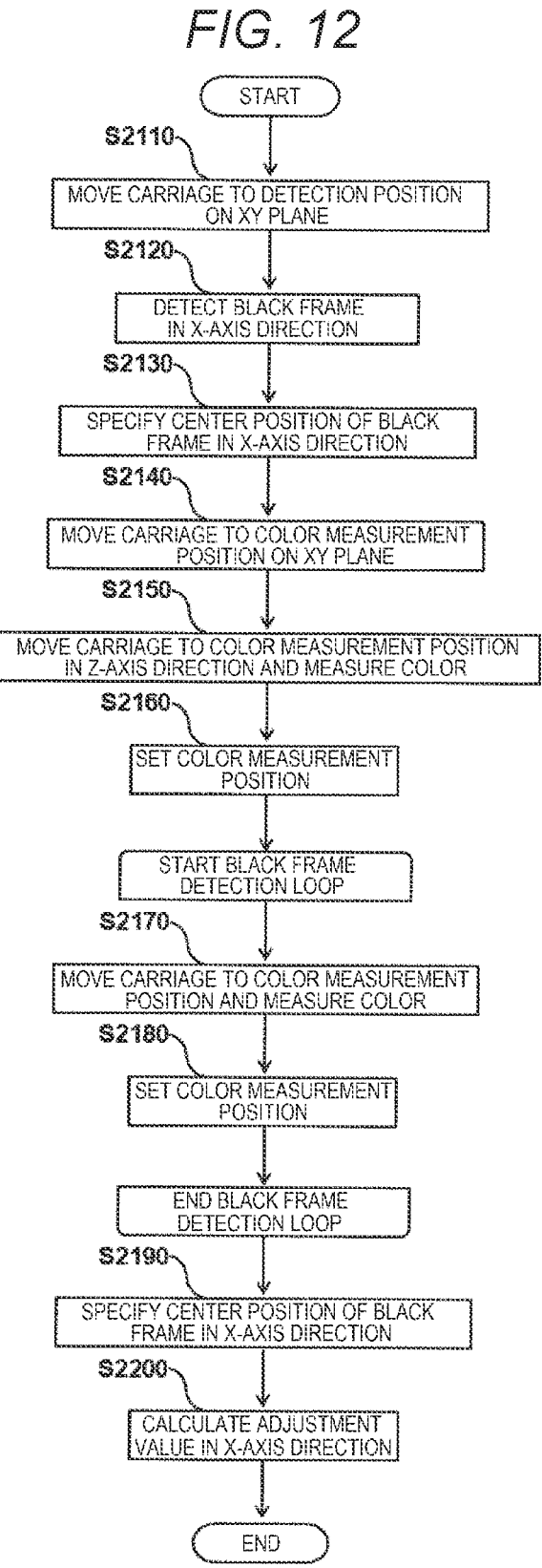
FIG. 12 is a flowchart showing a flow of an X-axis direction adjustment value calculation process in the flowchart of FIG. 10.
Figure 13:
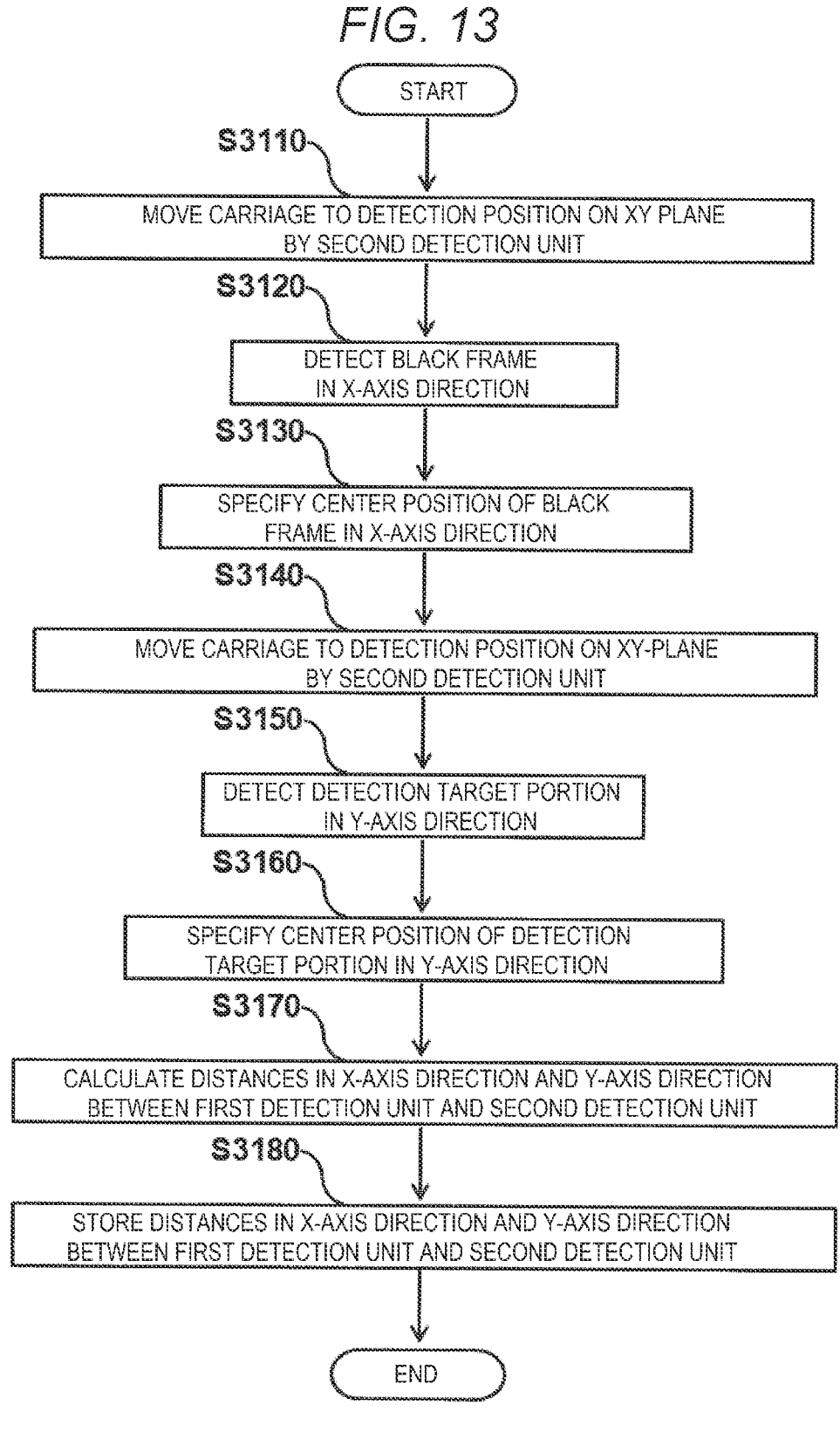
FIG. 13 is a flowchart showing a flow of an adjustment process between detection units in the flowchart of FIG. 10.
Figure 14:
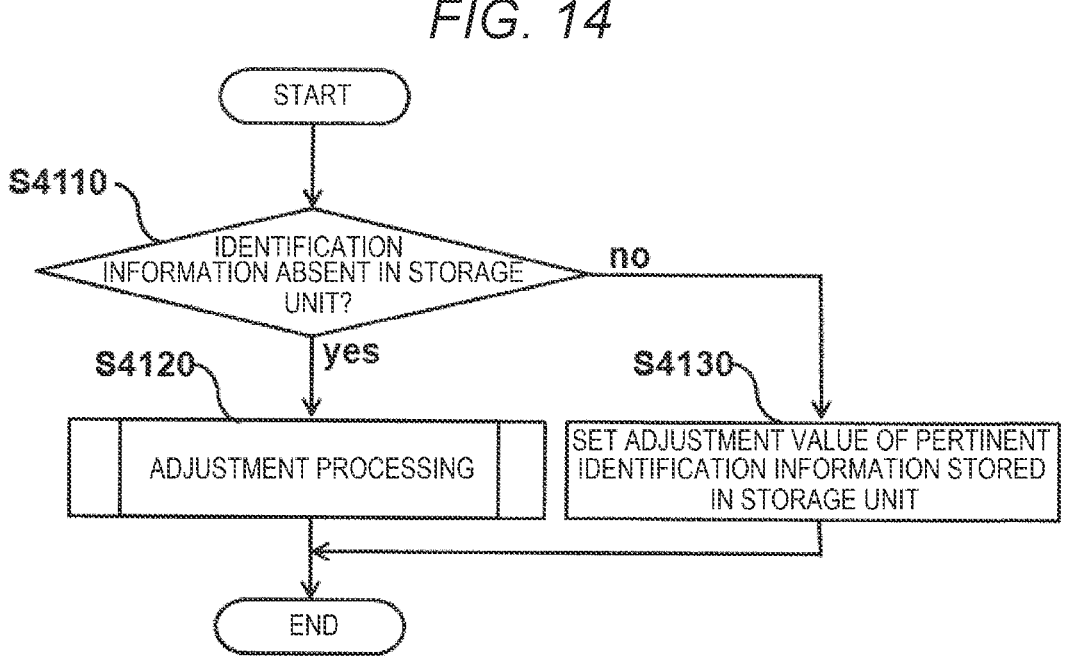
FIG. 14 is a flowchart showing a flow for determining whether to perform the adjustment method of the flowchart of FIG. 10.
Figure 15:
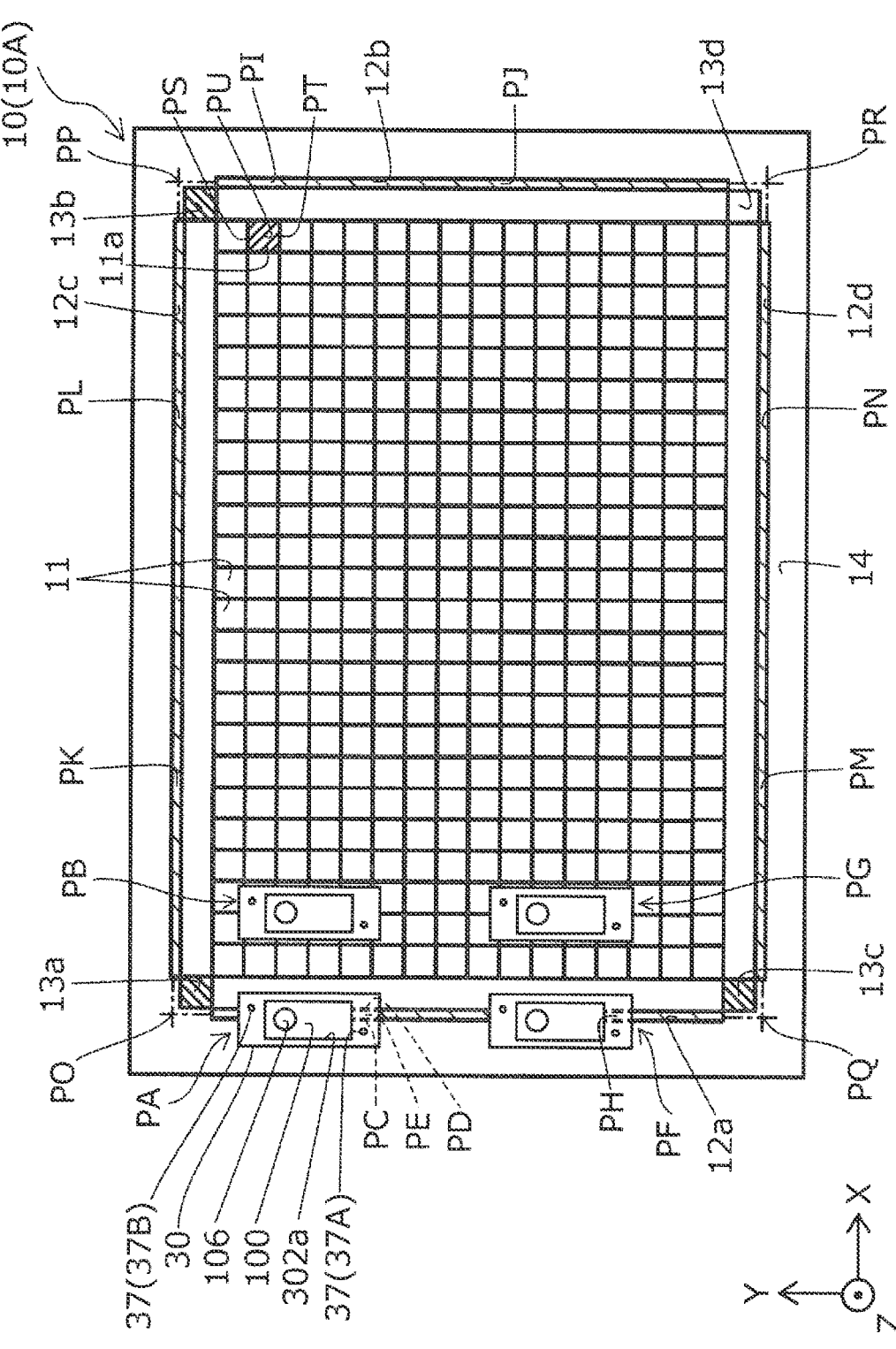
FIG. 15 is a plan view of a color chart as an example of a colorimetric object and is a view showing a position of a detection target portion and positions of a first detection unit and a second detection unit at the time of detection of the detection target portion by the first detection unit and the second detection unit.
Figure 16:
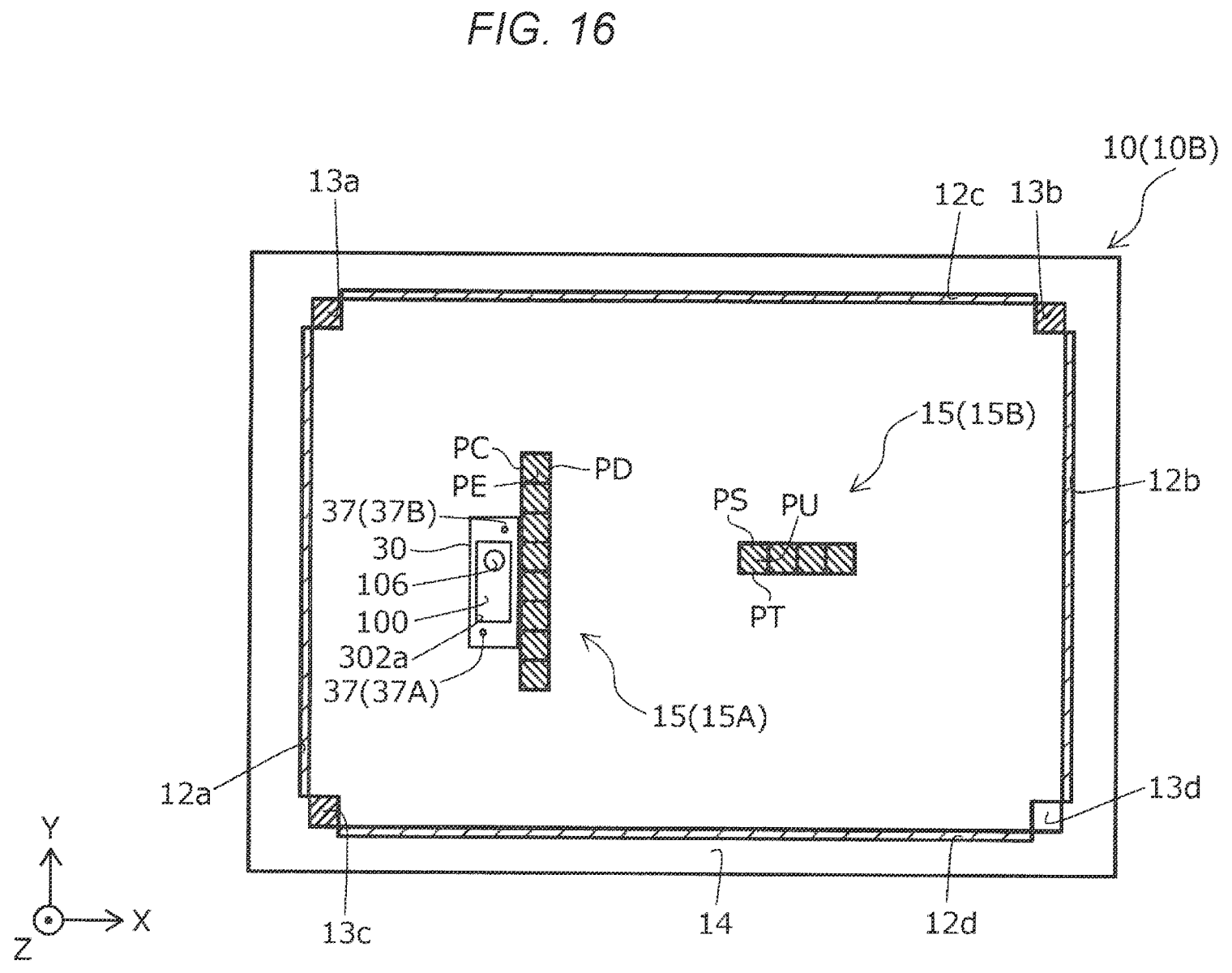
Figure 17:
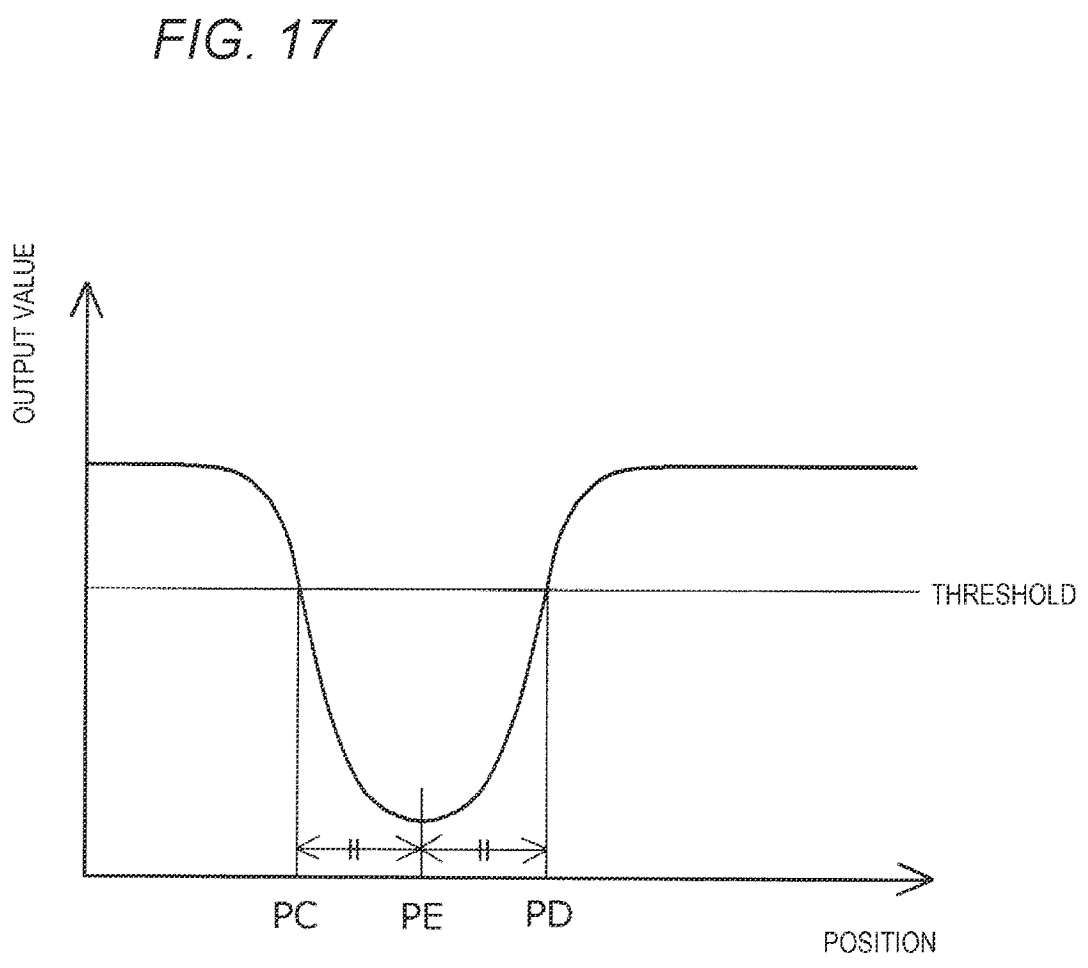
Figure 18:
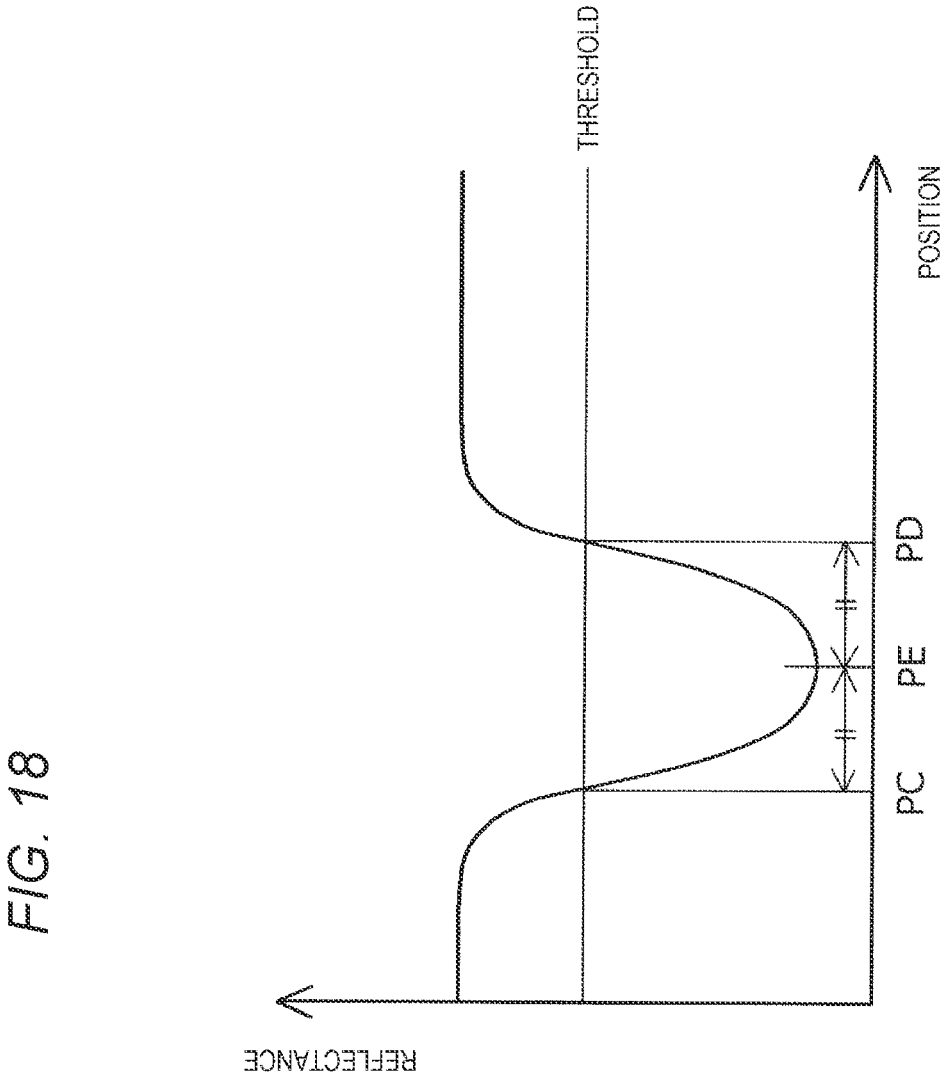
FIG. 18 is a graph showing a relation between the position of the colorimeter and reflectance at the time of color measurement of the detection target portion by the colorimeter.

Here, a flowchart of FIG. 10 is a flowchart of an example of an adjustment method for adjusting the color measurement position of the colorimeter 100 with respect to the detection position of the detection unit 37 performed using the colorimetric apparatus 1 in the present example. FIG. 11 is a flowchart showing a flow of a disposition detection process for a colorimetric object in the flowchart of FIG. 10. FIG. 12 is a flowchart showing a flow of an X-axis direction adjustment value calculation process in the flowchart of FIG. 10. FIG. 13 is a flowchart showing a flow of an adjustment process between detection units (between the front side sensor 37A, which is the first detection unit, and the rear side sensor 37B, which is the second detection unit) in the flowchart of FIG. 10. FIG. 14 is a flowchart showing a flow of determining whether to implement the adjustment method of the flowchart of FIG. 10. FIG. 15 is a plan view of the color chart 10A and is a view showing the position of the detection target portion and the positions of the front side sensor 37A and the rear side sensor 37B at the time when the detection target portion is detected by the front side sensor 37A and the rear side sensor 37B. FIG. 16 is a plan view of an example of the colorimetric object 10 different from the color chart 10A. FIG. 17 is a graph showing a relation between the position and an output value of the front side sensor 37A at the time when the front side sensor 37A detects the detection target portion. FIG. 18 is a graph showing a relation between the position of the colorimeter 100 and the reflectance at the time when the color of the detection target portion is measured by the colorimeter 100. In the adjustment method in the present example represented by the flowcharts of FIGS. 10 to 14, steps are executed by the control of the main board 52 serving as the control unit.

When the flowchart of FIG. 10 is started, first, in step S110, the main board 52 detects the thickness of the colorimetric object 10. A method of detecting the thickness of the colorimetric object 10 is performed by detecting the contact height of the carriage 30 as explained above. The main board 52 determines, based on the thickness of the colorimetric object 10 detected in step S110, positions of the front side sensor 37A and the rear side sensor 37B serving as the detection unit and a position of the carriage 30 in the Z-axis direction at the time when the detection target portion formed at the colorimetric object 10 is detected or the color of the detection target portion is measured by the colorimeter 100.

Subsequently, in step S120, the main board 52 detects disposition of the colorimetric object 10 on the support base 41, that is, positional deviation or inclination of the colorimetric object 10 from a desired position on the support base 41. In other words, in step S120, the main board 52 detects the black frames 12 serving as the detection target portion with the front side sensor 37A serving as the first detection unit and the rear side sensor 37B serving as the second detection unit and specifies the positions of the color patches 11 based on a result of the detection. The flow is explained in detail below with reference to FIGS. 11, 15, and 17. Note that, in FIG. 15, the carriage 30 is shown as a transparent view to clearly show the positions of the components.

The color chart 10A represented by FIG. 15 is square, and the black frames 12, which are linear detection target portions serving as detection target portions, are formed along four sides of the color chart 10A around a region where the color patches 11 are formed. Specifically, the color chart 10A represented by FIG. 15 includes, as the black frames 12, a black frame 12a formed in the vicinity of a side on the −X direction side of the color chart 10A, a black frame 12b formed in the vicinity of a side on the +X direction side of the color chart 10A, a black frame 12c formed in the vicinity of a side on the +Y direction side of the color chart 10A, and a black frame 12d formed in the vicinity of a side on the −Y direction side of the color chart 10A. The storage unit 52a of the colorimetric apparatus 1 stores information concerning a positional relationship of the color patches 11 with respect to the black frame 12a, the black frame 12b, the black frame 12c, and the black frame 12d. That is, the positions of the color patches 11 can be grasped from the positions of the respective black frames 12.

When the flowchart of FIG. 11 is started, first, in step S1110, the main board 52 drives the carriage motor 22 and the like to move the carriage 30 to a position PA represented by FIG. 15. Subsequently, in step S1120, the main board 52 drives the gantry motor 47 and the like to move the carriage 30 to a position PB represented by FIG. 15. Here, when moving the carriage 30 from the position PA to the position PB, the main board 52 turns on the front side sensor 37A and records an output value of the front side sensor 37A. A graph of FIG. 16 shows the output value of the front side sensor 37A at the time when the carriage 30 is moved from the position PA to the position PB.

Next, in step S1130, the main board 52 calculates boundary positions PC and PD of the black frame 12a with respect to the fabric portion 14 from the output value acquired in step S1120. Specifically, the main board 52 sets, as the boundary position PC, a point in time when the output value falls below a predetermined threshold and sets, as the boundary position PD, a point in time when the output value exceeds the threshold again. The main board 52 calculates an intermediate point between the boundary positions PC and PD as a center position PE of the black frame 12a. Here, a graph of FIG. 17 shows a relation between the position of the center position PE of the black frame 12a, which is the intermediate point between the boundary positions PC and PD, and the output value.

Subsequently, in step S1140, the main board 52 drives the carriage motor 22, the gantry motor 47, and the like to move the carriage 30 to a position PF represented by FIG. 15. The main board 52 drives the gantry motor 47 and the like to move the carriage 30 to a position PG represented by FIG. 15. Note that, at this time as well, the main board 52 turns on the front side sensor 37A and records an output value of the front side sensor 37A. Then, the main board 52 calculates a center position PH of the black frame 12a from the output value. Here, the center position PH deviates in the Y-axis direction with respect to the center position PE. A straight line connecting the center position PH and the center position PE is a center straight line of the black frame 12a.

In step S1150, the main board 52 calculates the center straight line of the black frame 12a.

Subsequently, in step S1160, the main board 52 calculates center positions PI and PJ of the black frame 12b and a center straight line of the black frame 12b in the same procedure as step S1110 to step S1150. However, at this time, the rear side sensor 37B is used rather than the front side sensor 37A. As represented by FIG. 11, the rear side sensor 37B is provided further on the +X direction side than the front side sensor 37A. For this reason, by detecting the black frame 12a on the −X direction side with the front side sensor 37A and detecting the black frame 12b on the +X direction side with the rear side sensor 37B, it is possible to narrow scanning ranges of the gantry 20 and the carriage 30 in the X-axis direction and it is possible to reduce the length of the support base 41 in the X-axis direction.

Subsequently, in step S1170, the main board 52 calculates center positions PK and PL of the black frame 12c and a center straight line of the black frame 12c in the same procedure as step S1110 to step S1150. However, a moving direction of the carriage 30 at the time when the black frame 12c is detected is the direction in the Y-axis direction. At this time, the rear side sensor 37B is used. Subsequently, in step S1180, the main board 52 calculates center positions PM and PN of the black frame 12d and a center straight line of the black frame 12d in the same procedure as step S1110 to step S1150. A moving direction of the carriage 30 at the time when the black frame 12d is detected is also the direction in the Y-axis direction. At this time, the front side sensor 37A is used. As represented by FIG. 15, the front side sensor 37A is provided further on the −Y direction side than the rear side sensor 37B. For this reason, by detecting the black frame 12c on the +Y direction side with the rear side sensor 37B and detecting the black frame 12d on the −Y direction side with the front side sensor 37A, it is possible to narrow the scanning range of the carriage 30 in the Y-axis direction and it is possible to reduce the length of the support base 41 in the Y-axis direction.

Subsequently, in step S1190, the main board 52 calculates intersections PO, PP, PQ, and PR from the center straight line of the black frame 12a, the center straight line of the black frame 12b, the center straight line of the black frame 12c, and the center straight line of the black frame 12d. Here, the main board 52 is capable of recognizing, from the positions of the intersections PO, PP, PQ, and PR, for example, whether the color chart 10A originally having a rectangular shape is, for example, deformed into a trapezoidal shape. Therefore, in step S1200, the main board 52 performs correction processing such as trapezoidal correction from the positions of the intersections PO, PP, PQ, and PR, specifies disposition of the color chart 10A, that is, the positions of the color patches 11, and ends the flowchart represented by FIG. 11.

Subsequently, in step S130 in the flowchart of FIG. 10, the main board 52 determines a moving position of the carriage 30 corresponding to the scanning range of the carriage 30 based on the disposition of the colorimetric object 10 detected in step S120. Then, in step S140, the main board 52 calculates an adjustment value for adjusting the color measurement position of the colorimeter 100 with respect to the detection position of the detection unit 37 in the X-axis direction. Details of step are represented by a flowchart of FIG. 12.

When step S140 of the flowchart of FIG. 10 is started, as represented by the flowchart of FIG. 12, first, in step S2110, the main board 52 moves the carriage 30 to a position where the black frame 12a, which is a detection target portion, can be started to be detected by the front side sensor 37A of the detection unit 37. In step S2120, the main board 52 scans the carriage 30 to detect the black frame 12a in the X-axis direction. In step S2130, the main board 52 specifies a center position of the black frame 12a in the X-axis direction. Note that a detection operation at this time is the same as step S1110 to step S1150 in the flowchart of FIG. 11. Specifically, for example, the main board 52 sets a position slightly further on the −X direction side than the boundary position PC as a detection start position, sets a position slightly further on the +X direction side than the boundary position PD as a detection end position, and calculates the center position PE in step S2130. More specifically, for example, as represented by FIG. 17, the main board 52 sets, as the boundary position PC, a point in time when an output value falls below a predetermined threshold and sets, as the boundary position PD, a point in time when the output value exceeds the threshold again. The main board 52 calculates an intermediate point between the boundary positions PC and PD as the center position PE of the black frame 12a. The main board 52 may perform the detection of the center position of the detection target portion in the X-axis direction twice, for example, by changing a place in the Y-axis direction as in the flow of the flowchart of FIG. 11 and specify the center position of the black frame 12a in the X-axis direction.

Subsequently, in step S2140, the main board 52 moves the carriage 30 to a position where the detection of the black frame 12a, which is the detection target portion, that is, the color measurement of the black frame 12a can be started by the colorimeter 100 on the X-Y plane. Then, in step S2150, the main board 52 moves the carriage 30 in a descending direction in the Z-axis direction and measures the color of the black frame 12a in a desired position in the Z-axis direction. In step S2160, the main board 52 sets the next color measurement position. Since the colorimeter 100 in the present example is configured to perform color measurement in a state in which the colorimeter 100 is stopped, the process explained above is performed. However, when the colorimeter 100 is configured to be capable of continuously performing the detection operation while moving in the same manner as the front side sensor 37A and the rear side sensor 37B do, instead of performing the process from step S2140 to step S2190 explained below, the main board 52 may perform the process from step S2110 to step S2130 with the front side sensor 37A read as the colorimeter 100.

After the execution of step S2160, the main board 52 starts a detection loop for the black frame 12a. In the detection loop for the black frame 12a, in step S2170, the main board 52 moves the carriage 30 to the set color measurement position and performs color measurement. Then, in step S2180, the main board 52 sets the next color measurement position. Note that, in the present example, in the detection loop for the black frame 12a, the main board 52 performs the color measurement while shifting the color measurement position little by little in the +X direction. Specifically, for example, the main board 52 sets a position slightly further on the −X direction side than the boundary position PC as a color measurement start position, sets a position slightly further on the +X direction side than the boundary position PD as a color measurement end position, and calculates the center position PE in step S2190 explained below. More specifically, for example, the main board 52 sets, as the boundary position PC, a point in time when reflectance exceeds a predetermined threshold and sets, as the boundary position PD, a point in time when the reflectance falls below the threshold again. The main board 52 calculates an intermediate point between the boundary positions PC and PD as the center position PE of the black frame 12a. A relation between the position of the carriage 30 and the reflectance obtained by the colorimeter 100 at this time is represented by a graph as shown in FIG. 18. Note that, as explained above, in the present example, in the detection loop for the black frame 12a, the main board 52 performs the color measurement while shifting the color measurement position little by little in the +X direction. Therefore, the relation between the position of the carriage 30 and the reflectance is represented by a plurality of points. In FIG. 18, the plurality of points are represented by being connected by a smooth line.

After performing the detection loop for the black frame 12a a desired number of times, the main board 52 ends the detection loop for the black frame 12a and shifts to step S2190. In step S2190, the main board 52 specifies the center position of the black frame 12a in the X-axis direction. Here, as in the flow of the flowchart of FIG. 11, for example, the main board 52 may repeat step S2110 to step S2190 twice while changing the place in the Y-axis direction and specify the center position of the black frame 12a in the X-axis direction. Note that, whereas the center position of the black frame 12a in the X-axis direction specified in step S2130 is a center position based on the detection position by the front side sensor 37A, the center position of the black frame 12a in the X-axis direction specified in step S2190 is a center position based on the color measurement position by the colorimeter 100. For this reason, in step S2200, the main board 52 calculates, based on these center positions, an adjustment value for adjusting the color measurement position of the colorimeter 100 with respect to the detection position of the front side sensor 37A in the X-axis direction and ends the flow of the flowchart of FIG. 12.

After the end of step S140 of the flowchart of FIG. 10, in step S150, the main board 52 calculates an adjustment value for adjusting the color measurement position of the colorimeter 100 with respect to the detection position of the detection unit 37 in the Y-axis direction. Details of step S150 can be explained by using a color patch 11a among the color patches 11 of the color chart 10A instead of the black frame 12a and reading the X-axis direction as the Y-axis direction in the flowchart of FIG. 12. Note that the boundary positions PC and PD and the center position PE in the explanation of the flowchart of FIG. 12 can be read as boundary positions PS and PT and a center position PU.

Here, as explained above, in the adjustment method of the flowchart of FIG. 10, the main board 52 executes step S140 and step S150 using the front side sensor 37A as the detection unit 37. However, as explained above, the colorimetric apparatus 1 in the present example includes the rear side sensor 37B in addition to the front side sensor 37A as the detection unit 37 and also uses the detection result of the rear side sensor 37B in step S120. Therefore, in step S160, the main board 52 adjusts the position of the carriage 30 based on a positional relationship between the front side sensor 37A and the rear side sensor 37B, which are the two detection units 37, specifically, the position of the rear side sensor 37B on the carriage 30 with respect to the position of the front side sensor 37A on the carriage 30. Note that details of step S160 are represented by a flowchart of FIG. 13.

When step S160 of the flowchart of FIG. 10 is started, as represented by the flowchart of FIG. 13, first, in step S3110, the main board 52 moves the carriage 30 to a position where detection of the black frame 12a, which is the detection target portion, can be started by the rear side sensor 37B of the detection units 37. In step S3120, the main board 52 scans the carriage 30 to detect the black frame 12a in the X-axis direction. In step S3130, the main board 52 specifies the center position of the black frame 12a in the X-axis direction. Note that, in the detection operation at this time, the front side sensor 37A is read as the rear side sensor 37B in the explanation of step S2110 to step S2130 in the flowchart of FIG. 12.

Subsequently, in step S3140, the main board 52 moves the carriage 30 to a position where detection of the color patch 11a, which is the detection target portion, can be started by the rear side sensor 37B. In step S3150, the main board 52 scans the carriage 30 to detect the color patch 11a in the Y-axis direction. In step S3160, the main board 52 specifies a center position of the color patch 11a in the Y-axis direction.

Subsequently, in step S3170, the main board 52 calculates a distance in the X-axis direction between the front side sensor 37A, which is the first detection unit, and the rear side sensor 37B, which is the second detection unit, from the center position of the black frame 12a in the X-axis direction specified by the front side sensor 37A by executing the flowchart of FIG. 12 and the center position of the black frame 12a in the X-axis direction specified by the rear side sensor 37B in step S3130. Further, in step S3170, the main board 52 calculates a distance in the Y-axis direction between the front side sensor 37A, which is the first detection unit, and the rear side sensor 37B, which is the second detection unit, from the center position of the color patch 11a in the Y-axis direction specified by the front side sensor 37A by executing the flowchart of FIG. 12 and the center position of the color patch 11a in the Y-axis direction specified by the rear side sensor 37B in step S3160.

Then, in step S3180, the main board 52 causes the storage unit 52a to store the distance in the X-axis direction and the distance in the Y-axis direction between the front side sensor 37A and the rear side sensor 37B and controls the movement of the carriage 30 based on these distances to end the entire process of the flowchart of FIG. 13, that is, step S160 of the flowchart of FIG. 10.

Subsequently, in step S170 of the flowchart of FIG. 10, the main board 52 calculates, based on the distance in the X-axis direction and the distance in the Y-axis direction between the front side sensor 37A and the rear side sensor 37B obtained by executing step S160, an adjustment value for adjusting the color measurement position of the colorimeter 100 with respect to the detection positions of the rear side sensor 37B in the X-axis direction and the Y-axis direction. Then, in step S170, the main board 52 causes the storage unit 52a to store the adjustment value for adjusting the color measurement position of the colorimeter 100 with respect to the detection positions of the rear side sensor 37B in the X-axis direction and the Y-axis direction obtained as explained above and the adjustment value for adjusting the color measurement position of the colorimeter 100 with respect to the detection positions of the front side sensor 37A in the X-axis direction and the Y-axis direction obtained in step S140 and step S150. According to the end of step S170, the main board 52 ends the flowchart of FIG. 10.

Note that, in the above explanation, the color chart 10A is used as the colorimetric object 10. That is, the detection target portion of the color chart 10A is formed at the color chart 10A, which is an example of the colorimetric chart and also plays a role of detecting the position of the color chart 10A supported by the support base 41. As explained above, since the detection target portion is provided in the color chart 10A, it is possible to save time and effort to prepare, separately from the color chart 10A, the colorimetric object 10 on which the detection target portion is formed.

However, in the adjustment method of the flowchart of FIG. 10, rather than the color chart 10A, the dedicated colorimetric object 10 for adjusting the color measurement position of the colorimeter 100 with respect to the detection position of the detection unit 37 can also be used. Here, FIG. 16 shows an example of a dedicated colorimetric object 10B for adjusting the color measurement position of the colorimeter 100 with respect to the detection position of the detection unit 37. As represented by FIG. 16, the colorimetric object 10B includes, in addition to the black frames 12, a detection target portion for X-axis direction adjustment 15A, which is a detection target portion 15 for calculating an adjustment value for adjusting the color measurement position of the colorimeter 100 with respect to the detection position of the detection unit 37 in the X-axis direction. Further, the colorimetric object 10B includes a detection target portion for Y-axis direction adjustment 15B, which is the detection target portion 15 for calculating an adjustment value for adjusting the color measurement position of the colorimeter 100 with respect to the detection position of the detection unit 37 in the Y-axis direction. The colorimetric apparatus 1 in the present example is capable of adjusting the color measurement position of the colorimeter 100 with respect to the detection position of the detection unit 37 by, for example, calculating the center position PE from the boundary positions PC and PD of the detection target portion for X-axis direction adjustment 15A and calculating the center position PU from the boundary positions PS and PT of the detection target section for Y-axis direction adjustment 15B.

As explained above, since the detection target portion 15 is formed at the colorimetric object 10 separate from the color chart 10A, for example, when an adjustment value is calculated only in an inspection process before shipment, it is possible to eliminate the need to form the detection target portion on the colorimetric chart and it is possible to expand a formation region of the color patches 11 of the color chart 10A.

As explained above, in the colorimetric apparatus 1 in the present example, the colorimeter 100 is provided to be attachable to and detachable from the colorimetric apparatus 1. For this reason, the colorimeter 100 can be used without being attached to the colorimetric apparatus 1. It is possible to improve convenience of use of the colorimeter 100.

Note that the adjustment method of the flowchart of FIG. 10 does not always need to be performed every time, for example, when the colorimeter 100 is not attached or detached since the last time of use of the colorimetric apparatus 1. Therefore, the colorimetric apparatus 1 in the present example can determine whether to perform the adjustment method of the flowchart of FIG. 10. Here, FIG. 14 is a flowchart showing a flow for determining whether to perform the adjustment method of the flowchart of FIG. 10.

In the flowchart of FIG. 14, first, in step S4110, the main board 52 serving as the control unit determines whether the identification number of the colorimeter 100 attached to the carriage 30 is provided in identification numbers stored in the storage unit 52a. Here, the colorimetric apparatus 1 in the present example is configured to be capable of recognizing an identification number set for each colorimeter 100. When determining in step S4110 that the identification number of the colorimeter 100 attached to the carriage 30 is not provided in the identification numbers stored in the storage unit 52a, the main board 52 proceeds to step S4120. In step S4120, the main board 52 executes adjustment processing corresponding to the adjustment method of the flowchart of FIG. 10. On the other hand, when determining in step S4110 that the identification number of the colorimeter 100 attached to the carriage 30 is provided in the identification numbers stored in the storage unit 52a, the main board 52 proceeds to step S4130, sets an adjustment value of the colorimeter 100 having the pertinent identification number stored in the storage unit 52a, and omits the execution of the adjustment processing corresponding to the adjustment method of the flowchart of FIG. 10.

As explained above, the colorimetric apparatus 1 in the present example causes the detection unit 37 to detect the detection target portion and specifies the first position, which is the detection position of the detection unit 37, causes the colorimeter 100 to measure the color of the detection target portion and specifies the second position, which is the color measurement position of the colorimeter 100, calculates the adjustment value based on the first position and the second position, and adjusts, based on the adjustment value, the position of the carriage 30 at the time when the color of the color patches 11 is measured. For this reason, for example, even when the positional relationship between the detection unit 37 and the colorimeter 100 deviates from the originally assumed positional relationship because, for example, the colorimeter 100 is replaced, it is possible to automatically optimize the positional relationship between the detection unit 37 and the colorimeter 100 and it is possible to suppress deterioration in color measurement accuracy due to deviation of the color measurement position of the colorimeter 100 with respect to the detection position of the detection unit 37. With this configuration, since the size of the color patches 11 can be reduced, it is possible to reduce a consumption amount of a medium used for the color chart 10A and it is possible to shorten a color measurement time. Note that, in the adjustment method of the flowchart of FIG. 10, as represented by the flowchart of FIG. 12, the main board 52 specifies the first position, which is the detection position of the detection unit 37, and then specifies the second position, which is the color measurement position of the colorimeter 100. However, the main board 52 may specify the second position, which is the color measurement position of the colorimeter 100, and then specify the first position, which is the detection position of the detection unit 37.

In addition, the colorimetric apparatus 1 in the present example includes the nonvolatile storage unit 52a that stores the adjustment value. As represented by step S170 of the flowchart of FIG. 10, the main board 52 serving as the control unit causes the storage unit 52a to store the adjustment value after calculating the adjustment value. For this reason, the colorimetric apparatus 1 in the present example can reuse an adjustment value calculated once even after the colorimetric apparatus 1 is turned on again and can shorten a time for calculating the adjustment value.

As explained above, when specifying the first position and the second position, for example, the colorimetric apparatus 1 in the present example calculates the center position PE from the boundary positions PC and PD and sets the center position PE as the first position and the second position. That is, the main board 52 specifies a position between both the ends of the detection target portion as the first position and the second position. With such a configuration, it is possible to accurately grasp the color measurement position of the colorimeter 100 with respect to the detection position of the detection unit 37. Note that, in the present example, the center position between both the ends of the detection target portion is specified as the first position and the second position. However, without being limited to such a configuration, the first position and the second position may not be the center position if the first position and the second position are a position between both the ends of the detection target portion.

In the colorimetric apparatus 1 in the present example, when causing the colorimeter 100 to measure the color of the detection target portion, the main board 52 repeatedly moves and stops the carriage 30, and causes the colorimeter 100 to measure the color of the detection target portion in a state in which the carriage 30 is stopped. For this reason, when the main board 52 causes the colorimeter 100 to measure the detection target portion, because of, for example, the configuration of the colorimeter 100, when it is difficult in principle to continuously measure the detection target portion or when a color measurement cycle is long and a color measurement interval tends to be long, by stopping the carriage 30 and performing the color measurement while shifting the color measurement position little by little, it is possible to increase the resolution of the detection target portion in the color measurement. Note that the colorimetric apparatus 1 in the present example is configured to perform the color measurement in the state in which the colorimetric apparatus 1 is stopped in the color measurement position. However, for example, a colorimetric apparatus capable of continuously measuring the color of the detection target portion may perform the color measurement in a state in which the colorimeter 100 is moved without stopping the carriage 30 in the color measurement position.

As explained above, the colorimetric apparatus 1 in the present example is capable of using the colorimeters 100 having different identification numbers. In other words, in the colorimetric apparatus 1 in the present example, the carriage 30 is configured to be capable of alternately supporting the first colorimeter and the second colorimeter as the colorimeter 100. By executing the adjustment method of the flowchart of FIG. 10, when the colorimeter 100 supported by the carriage 30 is changed from the first colorimeter to the second colorimeter, the main board 52 can cause the second colorimeter to measure the color of the detection target portion and specify the second position, recalculate an adjustment value, and adjust, based on the recalculated adjustment value, the position of the carriage 30 at the time when the color of the color patches 11 is measured. For this reason, when the colorimeter 100 supported by the carriage 30 is changed, it is possible to recognize the change and automatically calculate an adjustment value before color measurement.

Note that, even when the first colorimeter and the second colorimeter are not changed as the colorimeter 100, for example, the adjustment value may be calculated again when color measurement is performed a predetermined number of times, the adjustment value may be calculated again when color measurement is performed for a predetermined time, or the adjustment value may be calculated again when a predetermined time has elapsed from the last time when color measurement was performed. Further, a configuration may be adopted in which an operation unit through which the user can input an instruction to calculate the adjustment value again is provided or a configuration may be adopted in which the user manually executes calculating the adjustment value again.

Note that, as explained above, the carriage 30 includes the support unit 310 that supports the colorimeter 100, and the support unit 310 has the hole 302a, which is the opening that exposes the colorimetric surface 122 of the colorimeter 100 from the carriage 30 in the state in which the colorimeter 100 is supported. The front side sensor 37A as a first detection unit and the rear side sensor 37B as a second detection unit that detect the black frames 12, the corner detection target portions 13, and the like serving as the detection target portions are provided in the carriage 30 across the hole 302a. For this reason, by using the detection unit 37 closer to the detection target portion, it is possible to reduce the moving distance of the carriage 30 at least by the length of the opening (the hole 302a) and it is possible to reduce the apparatus in size.

In the colorimetric apparatus 1 in the present example, the main board 52 can calculate the adjustment value (the first adjustment value) corresponding to the front side sensor 37A using the detection position of the front side sensor 37A as represented by step S140 and step S150 and can calculate the adjustment value (the second adjustment value) corresponding to the rear side sensor 37B from the positional relationship between the front side sensor 37A and the rear side sensor 37B as shown in the flowchart of FIG. 13. The position of the carriage 30 at the time when the color of the color patches 11 is measured can be adjusted based on the first adjustment value and the second adjustment value. For this reason, it is possible to omit the detection operation by the rear side sensor 37B when calculating the second adjustment value and it is possible to reduce a time for calculating the second adjustment value.

In the colorimetric apparatus 1 in the present example, the main board 52 can calculate the adjustment value (the first adjustment value) corresponding to the front side sensor 37A using the detection position of the front side sensor 37A as represented by step S140 and step S150 and can also calculate the adjustment value (the second adjustment value) corresponding to the rear side sensor 37B using the detection position of the rear side sensor 37B in the same procedure as step S140 and step S150. The position of the carriage 30 at the time when the color of the color patches 11 is measured can be adjusted based on the first adjustment value and the second adjustment value. By performing such a procedure, it is possible to divert the method of calculating the first adjustment value to the method of calculating the second adjustment value and it is possible to simplify a control flow.

As explained above, the front side sensor 37A and the rear side sensor 37B are provided in the different positions in both of the Y-axis direction serving as the first direction and the X-axis direction serving as the second direction, which is the direction intersecting the Y-axis direction. For this reason, for example, as represented by FIG. 15, with respect to the color chart 10A in which the black frames 12 are formed in different two positions in the Y-axis direction and in different two positions in the X-axis direction, it is possible to reduce the moving distance of the carriage 30 in the Y-axis direction and in the X-axis direction. For this reason, the colorimetric apparatus 1 in the present example can measure the color of the color patches 11 formed at the color chart 10A without positional deviation while particularly effectively suppressing an increase in the size of the colorimetric apparatus 1.

The color chart 10A represented by FIG. 15 is rectangular and the black frames 12, which are the linear detection target portions serving as the detection target portions, are formed along the four sides of the color chart 10A. As explained above, the colorimetric apparatus 1 in the present example can specify, according to the control of the main board 52, the positions of the color patches 11 based on the result of the front side sensor 37A and the rear side sensor 37B detecting the black frames 12. With such a configuration, since the four sides of the color chart 10A can be measured, for example, by calculating the intersections PO, PP, PQ, and PR of the four sides of the color chart 10A, it is possible to accurately grasp, for example, the inclination of the color chart 10A with respect to the support base 41 and it is possible to particularly accurately specify the positions of the color patches 11.

For example, the color chart 10A made of a soft material is easily deformed and the rectangular color chart 10A is sometimes supported by the support base 41 in a trapezoidal shape. In such a case, if it is attempted to specify the positions of the color patches 11 on the assumption that the color chart 10A is rectangular, it is likely that the positions of the color patches 11 deviate from actual positions. However, the colorimetric apparatus 1 in the present example calculates, according to the control of the main board 52, the positions of the center straight lines of the four black frames 12 and the positions of the intersections PO, PP, PQ, and PR of the center straight lines based on the results of the front side sensor 37A and the rear side sensor 37B detecting, at least at two points, the black frames 12 corresponding to each one side of the color chart 10A and specifies the positions of the color patches 11 based on the calculated positions of the intersections PO, PP, PQ, and PR. For this reason, even when the rectangular color chart 10A is supported by the support base 41 in a state in which the rectangular color chart 10A is deformed into a trapezoidal shape, it is possible to grasp, based on the detection results of the front side sensor 37A and the rear side sensor 37B, that the color chart 10A is supported by the support base 41 in a trapezoidal shape and it is possible to accurately specify the positions of the color patches 11 based on the calculated positions of the intersections PO, PP, PQ, and PR.

In addition, as represented by FIG. 15, the color chart 10A shown in FIG. 15 is square and the corner detection target portions 13 are formed at the four corners of the color chart 10A. Corner detection target portions 13a, 13b, and 13c among the corner detection target portions 13 are black patches and a corner detection target portion 13d is a white patch. According to the control of the main board 52, the colorimetric apparatus 1 in the present example can cause the front side sensor 37A and the rear side sensor 37B to detect at least three among the four corner detection target portions 13 and can specify, based on the detection results of the front side sensor 37A and the rear side sensor 37B, the direction of the color chart 10A supported by the support base 41. Note that it is also possible to use the corner detection target portion 13 instead of the color patch 11a.

The present disclosure is not limited to the example explained above and can be implemented in various configurations without departing from the gist of the present disclosure. For example, the colorimetric apparatus 1 in the present example is configured to measure the color of the colorimetric object in the state in which the colorimetric apparatus 1 is in contact with the colorimetric object but may be applied to a configuration in which the colorimetric apparatus 1 measures the color of the colorimetric object in a state in which the colorimetric apparatus 1 is not in contact with the colorimetric object. For example, technical features in the example corresponding to technical features in the aspects described in the summary can be substituted and combined as appropriate in order to solve a part or all of the problems described above or in order to achieve a part or all of the effects described above. Unless the technical features are explained as essential technical features in the specification, the technical features can be deleted as appropriate.

What is claimed is:

25 26

1. A colorimetric apparatus to which a colorimeter configured to measure a color of a patch formed at a colorimetric chart is attachable, the colorimetric apparatus comprising:
   a support base configured to support a colorimetric object, which includes the colorimetric chart;
   a carriage including a detection unit configured to detect a detection target portion formed at the colorimetric object, the carriage supporting the colorimeter;
   a movement unit configured to move the carriage on the support base; and
   a control unit, wherein
   the control unit causes the detection unit to detect the detection target portion and specifies a first position, which is a detection position of the detection unit, causes the colorimeter to measure a color of the detection target portion and specifies a second position, which is a color measurement position of the colorimeter, calculates an adjustment value based on the first position and the second position, and adjusts, based on the adjustment value, a position of the carriage at a time when the color of the patch is measured.

2. The colorimetric apparatus according to claim 1, further comprising a nonvolatile storage unit configured to store the adjustment value, wherein
   after calculating the adjustment value, the control unit causes the storage unit to store the adjustment value.

3. The colorimetric apparatus according to claim 1, wherein the control unit specifies a position between both ends of the detection target portion as the first position and the second position.

4. The colorimetric apparatus according to claim 1, wherein, when causing the colorimeter to measure the color of the detection target portion, the control unit repeatedly moves and stops the carriage and causes the colorimeter to measure the color of the detection target portion in a state in which the carriage is stopped.

5. The colorimetric apparatus according to claim 1, wherein
   a first colorimeter and a second colorimeter are changeable as the colorimeter, and
   when the colorimeter supported by the carriage is changed from the first colorimeter to the second colorimeter, the control unit causes the second colorimeter to measure the color of the detection target portion and specifies the second position, recalculates the adjustment value, and adjusts, based on the recalculated adjustment value, the position of the carriage at the time when the color of the patch is measured.

6. The colorimetric apparatus according to claim 1, further comprising a support unit configured to support the colorimeter, the support unit having an opening through which a colorimetric unit of the colorimeter is exposed from the carriage in a state in which the colorimeter is supported by the support unit, wherein
   the detection unit includes a first detection unit and a second detection unit provided across the opening, and
   the control unit calculates a first adjustment value serving as the adjustment value corresponding to the first detection unit using a detection position of the first detection unit and calculates a second adjustment value serving as the adjustment value corresponding to the second detection unit using a detection position of the second detection unit and adjusts, based on the first adjustment value and the second adjustment value, the position of the carriage at the time when the color of the patch is measured.

7. The colorimetric apparatus according to claim 6, wherein
   the movement unit moves the carriage in a first direction and a second direction intersecting the first direction, and
   the first detection unit and the second detection unit are provided in different positions in both of the first direction and the second direction.

8. The colorimetric apparatus according to claim 6, wherein
   the detection target portion is formed at the colorimetric chart,
   the colorimetric chart is square and a linear detection target portion serving as the detection target portion is formed along four sides of the colorimetric chart, and
   the control unit specifies the position of the patch based on a result of the first detection unit and the second detection unit detecting the linear detection target portion.

9. The colorimetric apparatus according to claim 8, wherein the control unit calculates positions of four straight lines extending along the linear detection target portion and positions of intersections of the straight lines based on a result of the first detection unit and the second detection unit detecting, at least at two points, the linear detection target portion corresponding to each one side of the colorimetric chart and specifies the position of the patch based on the calculated positions of the intersections.

10. The colorimetric apparatus according to claim 6, wherein
   the detection target portion is formed at the colorimetric chart,
   the colorimetric chart is square, corner detection target portions serving as the detection target portion are formed at least at three corners among four corners of the colorimetric chart, and
   the control unit specifies, based on a result of the first detection unit and the second detection unit detecting the corner detection target portions, a direction of the colorimetric object supported by the support base.

11. The colorimetric apparatus according to claim 1, further comprising a support unit configured to support the colorimeter, the support unit having an opening through which a colorimetric unit of the colorimeter is exposed from the carriage in a state in which the colorimeter is supported by the support unit, wherein
   the detection unit includes a first detection unit and a second detection unit provided across the opening, and
   the control unit calculates a first adjustment value serving as the adjustment value corresponding to the first detection unit using a detection position of the first detection unit and calculates a second adjustment value serving as the adjustment value corresponding to the second detection unit from a positional relationship between the first detection unit and the second detection unit and adjusts, based on the first adjustment value and the second adjustment value, the position of the carriage at the time when the color of the patch is measured.

12. The colorimetric apparatus according to claim 1, wherein the detection target portion is formed at the colorimetric chart and also plays a role of detecting a position of the colorimetric chart supported by the support base.

13. The colorimetric apparatus according to claim 1, wherein the detection target portion is formed at the colorimetric object separate from the colorimetric chart.

14. The colorimetric apparatus according to claim 1, wherein the colorimeter is provided to be attachable to and detachable from the colorimetric apparatus.

15. An adjustment method for adjusting a color measurement position of a colorimeter with respect to a detection position of a detection unit in a colorimetric apparatus to which the colorimeter configured to measure a color of a patch formed at a colorimetric chart is attachable, the colorimetric apparatus including: a support base configured to support a colorimetric object, which includes the colorimetric chart; a carriage including a detection unit configured to detect a detection target portion formed at the colorimetric object, the carriage supporting the colorimeter; and a movement unit configured to move the carriage on the support base, the adjustment method comprising:

causing the detection unit to detect the detection target portion and specifying a first position, which is a detection position of the detection unit;

causing the colorimeter to measure a color of the detection target portion and specifying a second position, which is a color measurement position of the colorimeter; and calculating an adjustment value based on the first position and the second position and adjusting, based on the adjustment value, a position of the carriage at a time when the color of the patch is measured.

* * * * *